(12) United States Patent
Swensen et al.

(10) Patent No.: US 12,162,755 B2
(45) Date of Patent: Dec. 10, 2024

(54) ULTRA-HIGH TEMPERATURE PYROLYSIS SEPARATION OF HYDROGEN AND CARBON

(71) Applicant: Omnis Advanced Technologies, LLC, Santa Barbara, CA (US)

(72) Inventors: James S. Swensen, Santa Barbara, CA (US); Stephen P. Gibbel, Falls City, OR (US); David S. Gibbel, Falls City, OR (US); Douglas E. Grunder, Mt. Vernon, IA (US); Simon K. Hodson, Santa Barbara, CA (US)

(73) Assignee: Omnis Advanced Technologies, LLC, Santa Barbara, CA (US)

( * ) Notice: Subject to any disclaimer, the term of this patent is extended or adjusted under 35 U.S.C. 154(b) by 77 days.

(21) Appl. No.: 18/122,614

(22) Filed: Mar. 16, 2023

(65) Prior Publication Data
US 2023/0294983 A1 Sep. 21, 2023

Related U.S. Application Data

(60) Provisional application No. 63/320,667, filed on Mar. 16, 2022.

(51) Int. Cl.
*C01B 3/24* (2006.01)

(52) U.S. Cl.
CPC ........ *C01B 3/24* (2013.01); *C01B 2203/0272* (2013.01); *C01B 2203/049* (2013.01); *C01B 2203/0883* (2013.01); *C01B 2203/84* (2013.01)

(58) Field of Classification Search
CPC .............. C01B 3/24; C01B 2203/84; C01B 2203/0272
USPC .......................................................... 423/650
See application file for complete search history.

(56) References Cited

U.S. PATENT DOCUMENTS

| 5,092,766 A | 3/1992 | Kubotani |
| 2005/0089454 A1 | 4/2005 | Suzuki |

FOREIGN PATENT DOCUMENTS

| WO | 2006035210 A1 | 4/2006 |
| WO | 2010127961 A1 | 11/2010 |

*Primary Examiner* — Anita Nassiri-Motlagh
(74) *Attorney, Agent, or Firm* — KIRTON McCONKIE; Evan R. Witt

(57) ABSTRACT

A continuous hydrocarbon pyrolysis process to produce hydrogen gas and carbon includes exposing a hydrocarbon feedstock to an oxygen depleted combustion gas within a hydrocarbon pyrolysis zone. A valveless pulse combustor produces the combustion gas at a temperature greater than 2,400° C. The hydrocarbon feedstock and combustion gas have a residence time within the hydrocarbon pyrolysis zone less than 30 seconds to cause pyrolysis of the hydrocarbon feedstock and produce gas comprising hydrogen and solid particles comprising carbon. The gas and solid particles exit the hydrocarbon pyrolysis zone at a temperature greater than 1,200° C. A heat exchanger cools the gas and solid particles to a temperature less than 200° C. A gas absorber removes unwanted gas molecules from the gas and produce $H_2$ containing gas having an $H_2$ concentration greater than 80 vol. % $H_2$. The $H_2$ containing gas is continuously introduced to a $H_2$ consuming facility.

25 Claims, 15 Drawing Sheets

ULTRA-HIGH TEMPERATURE PYROLYSIS SEPARATION OF HYDROGEN AND CARBON

CROSS-REFERENCE TO RELATED APPLICATION

This application claims the benefit of U.S. Provisional Application No. 63/320,667, filed Mar. 16, 2022, and entitled PYROLYSIS SEPARATION OF HYDROGEN AND CARBON. The prior application is incorporated by reference.

BACKGROUND OF THE INVENTION

The disclosure relates to pyrolysis of hydrocarbons at ultra-high temperature in an oxygen depleted or oxygen deprived environment so that cost effective harvesting of hydrogen and high purity carbon is possible with reduced or no greenhouse emissions.

There is growing interest in reducing greenhouse gas emission. A major source for greenhouse gas emission comes from burning gaseous, liquid, and/or solid fossil fuels to produce heat. In power plants, the heat is then converted into electricity, usually through a steam turbine or direct drive. All fossil fuels are hydrocarbons meaning that the material has both carbon and hydrogen atoms. As an example, the chemical formula for methane is $CH_4$. There are 4 hydrogen atoms for each carbon atom. Carbon has an atomic weight of 12 g/mol. Hydrogen has an atomic weight of 1 g/mol. The molecular weight of methane is 16 g/mol. The weight percent of carbon and hydrogen in methane is 75 wt. % carbon and 25 wt. % hydrogen.

The balanced chemical reaction to stoichiometrically burn methane is:

$$CH_4 + 2O_2 \rightarrow CO_2 + 2H_2O.$$

Stoichiometrically burning 1 mole of $CH_4$ produces 1 mole of $CO_2$. $CO_2$ has a molecular weight of 44 g/mol. Burning 1 mole (16 grams) of $CH_4$ produces 1 mole (44 grams) of $CO_2$.

There is a need to process hydrocarbons via an efficient and economical process to liberate the hydrogen as $H_2$ gas while capturing much of the carbon as a solid carbon. Non-limiting examples of potential uses of captured solid carbon include chemical feedstock, carbon electrodes, high temperature refractory materials, and batteries. The battery market will continue to grow to support both the electrification of vehicles and grid energy storage. These examples are not intended to set a limitation to the potential uses of the carbon produced via the process described herein. The solid carbon can be sequestered to keep it from going into the air as $CO_2$. Sequestration would be the least valuable use of the carbon.

Hydrogen gas ($H_2$) is the molecule with the lowest molecular weight at 2 g/mol. It is not economically feasible to liquefy $H_2$ for storage and transportation. High pressure tanks and pipes are among methods discussed to increase energy density for transportation and storage of hydrogen gas. High pressure transportation gas pipelines are typically made from metal, usually iron and steel. Over time, hydrogen can react with the metal, causing it to become brittle. Brittle metal under high pressure is susceptible to failure. It is well known that natural gas pipelines eventually start to leak at most of their joints. If natural gas or methane, with a molecular weight of about 16 g/mol easily leaks, then hydrogen gas, with a lower molecular weight of 2 g/mol is expected to leak as much or significantly more. While leaking $H_2$ would not be considered a greenhouse gas risk, unlike leaking $CH_4$, loss of $H_2$ via leaks during long-distance, high-pressure transport of $H_2$ gas is a significant economic risk.

Thus, there is a great need to process hydrocarbons in an efficient and low-cost manner to harvest high quality hydrogen, carbon, and other products. There is a need to produce hydrogen for immediate use with little or no storage and transportation.

SUMMARY OF THE INVENTION

The disclosure relates to processes which convert gaseous, liquid, and/or solid hydrocarbons to hydrogen and solid carbon, while minimizing carbon dioxide emissions. The disclosed process includes a rapid, ultra-high temperature pyrolysis of hydrocarbons.

The disclosed hydrocarbon pyrolysis process produces hydrogen gas and carbon by exposing a hydrocarbon feedstock to a high temperature, oxygen depleted combustion gas. As described below, in some embodiments, the high temperature, oxygen depleted combustion gas is obtained from combustion gas exiting a valveless pulse combustor (VPC) to cause pyrolysis of the hydrocarbon feedstock and produce hydrogen gas and carbon.

The hydrocarbon pyrolysis process disclosed herein shows pyrolysis of hydrocarbons at high temperatures (>2,400° C.) and short residence times (<than 30 seconds) in oxygen depleted gas to produce hydrogen and carbon.

As used herein, the term high temperature, oxygen depleted combustion gas has an initial temperature in the range of about 2,400° C. to about 3,400° C., or greater, that is, about 2,400° C., 2,500° C., 2,600° C., 2,700° C., 2,800° C., 2,900° C., 3,000° C., 3,100° C., 3,200° C., 3,300° C., 3,400° C., or greater than 3400° C., where any of the stated values can form an upper or lower endpoint of a range. As used herein, the term "ultra-high temperature" includes combustion gas temperatures above 3,000° C. Upon initial contact with the hydrocarbon feedstock, the combustion gas immediately begins to cool as the energy in the form of heat from the high temperature or ultra-high temperature combustion gas is transferred to the hydrocarbon feedstock to increase the temperature of the hydrocarbon feedstock.

As used herein, the terms oxygen depleted, oxygen deprived, or very low excess oxygen mean less than about 4 vol. %, 3 vol. %, 2 vol. %, 1 vol. %, 0.5 vol. %, 0.2 vol. %, 0.1 vol. % $O_2$, where any of the stated values can form an upper or lower endpoint of a range.

As used herein, the term short residence time means an exposure time of the hydrocarbon feedstock to the high temperature, oxygen depleted gas for a time period less than 30 seconds. The entire exposure time of the hydrocarbon feedstock to the high temperature may be greater than a second due to transport time within process system equipment. The exposure time may be less than 30 seconds, 25 seconds, 20 seconds, 18 seconds, 16 seconds, 14 seconds, 12 seconds, 10 seconds, 9 seconds, 8 seconds, 7 seconds, 6 seconds, 5 seconds, 4 seconds, 3 seconds, 2 seconds, and 1 second, where any of the stated values can form an upper or lower endpoint of a range.

As used herein, the term hydrocarbon includes, but it is not limited to fossil fuels, such as coal, oil, and natural gas, wood, biowaste, etc.

In some embodiments, the high temperature, oxygen depleted gas is obtained from combustion gas exiting a valveless pulse combustor (VPC) or pulse jet to cause pyrolysis of the hydrocarbon feedstock and produce hydrogen gas and carbon. The VPC not only provides the hot combustion gas for the pyrolysis process, but the VPC also provides a sonic energy source. Valveless pulse combustors create a pressure wave at about 20 to 200 Hz to further improve efficiency of hydrocarbon processing via pyrolysis separation. Without being bound by theory, the pressure pulses in the form of sonic energy added to the pyrolysis process by the VPC serve to improve reaction kinetics of the various reactions that take place during the disclosed pyrolysis separation of hydrogen and carbon.

In some embodiments, rather than use atmospheric air that is approximately 20 vol. % oxygen and 80 vol. % nitrogen as the oxygen source for combustion in the VPC, the oxygen is concentrated from air to an amount greater than 50 vol. % $O_2$. In some non-limiting embodiments, the oxygen is concentrated to an amount greater than 60 vol %. In some non-limiting embodiments, the oxygen is concentrated to an amount greater than 70 vol %. In some non-limiting embodiments, the oxygen is concentrated to an amount greater than 75 vol %. In some non-limiting embodiments, the oxygen is concentrated to an amount greater than 85 vol %. In some non-limiting embodiments, the oxygen is concentrated to an amount greater than 90 vol %. In some non-limiting embodiments, the oxygen is concentrated to an amount greater than 93 vol %. It is understood that the higher oxygen content allows for a higher flame temperature and a higher combustion gas temperature.

Disclosed embodiments of the high temperature continuous process impart significant and unexpected value to the carbon fraction, thus enabling and supporting the economic feasibility of this pyrolysis approach to producing hydrogen. The hydrogen produced herein may advantageously be used as a combustion fuel or a chemical reactant in a continuous process.

In some disclosed embodiments, the hydrogen production is co-located adjacent or close to the hydrogen gas point-of-use as part of a continuous process with no long-term $H_2$ storage and short distance $H_2$ transport from the point of production to the nearby point-of-use at the pressure needed for $H_2$ gas use. By so doing, hydrogen storage requirements are minimized or eliminated. Hydrogen transportation is a short distance at the pressure needed by the point of use.

A non-limiting potential use of a co-located or point-of-use hydrogen gas production facility includes electricity generation. For example, the high temperature pyrolysis process can be scaled to produce enough hydrogen to operate full-size power plants, e.g., 600 MW. Smaller or larger power plant sizes can be supported. The 600 MW power plant is a non-limiting example.

Another non-limiting potential use of a co-located or point-of-use hydrogen gas production facility includes metal production where the hydrogen is used as part of a process to reduce a metal ore to the elemental metal form. Another non-limiting potential use of a co-located hydrogen gas production facility includes chemical processes that need hydrogen as a reactant, such as an ammonia production process.

The production of hydrogen gas at the point-of-use at commercial scale, while minimizing or eliminating $CO_2$ emissions by producing a valuable solid carbon product rather than $CO_2$ waste gas, is a significant advancement of the art.

As used herein, wt. % means weight percent.
As used herein vol. % means volume percent.

As used herein, mol % means mole percent, i.e., a percentage based on the number of moles of gas molecules in a gas stream. In ideal gases, vol. % and mol % are equivalent.

As used herein, MTPH means metric tons per hour.
As used herein, VPC means valveless pulse combustor.
As used herein, MW means megawatt.
As used herein, MM means million.
As used herein, Btu means British thermal unit, which is equivalent to about 1055 Joules.
As used herein, MAF mean moisture ash free.

As used herein, the expression [A], [B], [C], "and/or" [D] means that one or more of the cases connected by the expression "and/or" may occur individually or in combination. Thus, the expression means [A] or [B] or [C] or [D] may occur individually, or combinations of any two or more cases may occur, such as [A] and [B], [A] and [C], [B] and [C], [A], [C], and [D], etc.

As used herein, unless explicitly stated otherwise or clearly implied otherwise, the term "about" refers to a range of values plus or minus 10 percent ("±10%"), e.g., about 1.0 encompasses values from 0.9 to 1.1.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include the individual values and sub-ranges within the indicated range. Thus, included in this numerical range are individual values such as 2, 3, and 4 and sub-ranges such as from 1-3, from 2-4, and from 3-5, etc. This same principle applies to ranges reciting only one numerical value. Furthermore, such an interpretation should apply regardless of the range or the characteristics being described.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Additionally, while the following description refers to several embodiments and examples of the various components and processes of the described invention, all of the described embodiments and examples are to be considered, in all respects, as illustrative only and not as being limiting in any manner. Furthermore, the described features, structures, characteristics, processes, or methods of the invention may be combined in any suitable manner in one or more embodiments.

It is to be understood that both the foregoing general description and the following detailed description are exemplary and explanatory and are not restrictive of the invention, as claimed. It is understood that specific aspects and features of the disclosed invention may be freely combined with other specific aspects and features of the disclosed invention. It should be understood that the various embodiments are not limited to the arrangements and instrumentality shown in the drawings. It should also be understood that the embodiments may be combined, or that other embodiments may be utilized and that structural changes, unless so claimed, may be made without departing from the scope of the various embodiments of the present invention. The following detailed description is, therefore, not to be taken in a limiting sense.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 7 also shows an optional secondary heating zone for the carbon particles exiting the underflow of the Cyclone Gas/Particle Separator and the Baghouse Gas/Particle Separator.

DESCRIPTION OF THE INVENTION

This disclosure relates to a continuous hydrocarbon pyrolysis process to produce hydrogen gas and carbon. The process includes exposing a hydrocarbon feedstock to an oxygen depleted combustion gas within a hydrocarbon pyrolysis zone. The combustion gas is preferably produced by a valveless pulse combustor. When the hydrocarbon feedstock and combustion gas enter the hydrocarbon pyrolysis zone, the combustion gas has a temperature greater than 2,400° C. The hydrocarbon feedstock and combustion gas have a residence time within the hydrocarbon pyrolysis zone less than 30 seconds to cause pyrolysis of the hydrocarbon feedstock and produce gas comprising hydrogen and solid particles comprising carbon.

Figure 1:
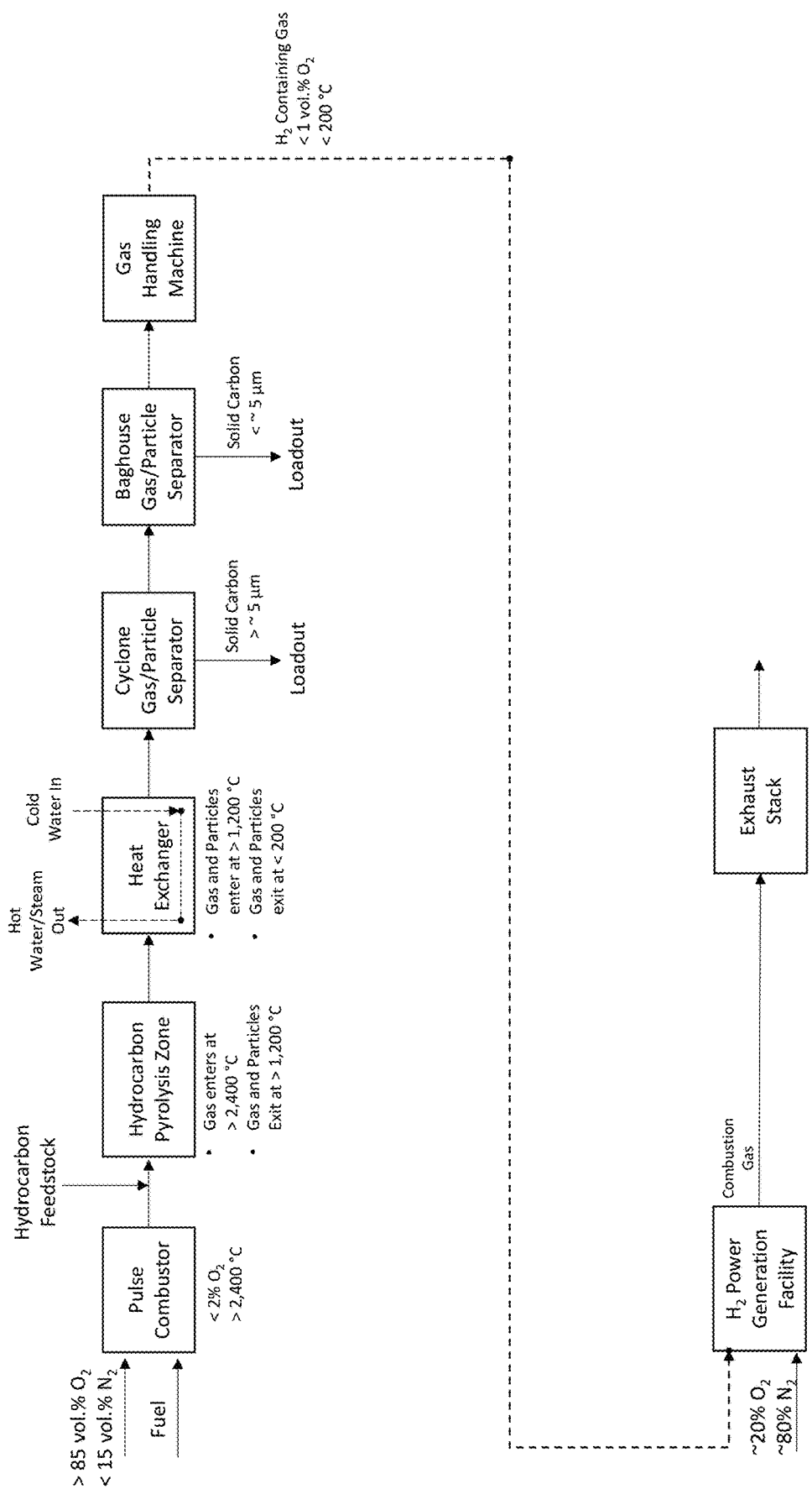
FIG. 1 shows a hydrocarbon pyrolysis process where hydrogen gas produced is consumed directly by a hydrogen-fired power generation facility.

FIG. 1 shows an embodiment of the disclosed hydrocarbon pyrolysis process. The hydrocarbon pyrolysis process shown in FIG. 1 provides on-site production of $H_2$ for local consumption of $H_2$ by an adjacent facility. In the disclosed embodiment, the facility is a $H_2$ fired power generation facility. However, it will be appreciated that a different facility which requires a continuous source of $H_2$ may be used.

A valveless pulse combustor (VPC) is used as the heat source for the pyrolysis process. A fuel and an oxygen containing gas stream are mixed in the combustion chamber of the VPC. The oxygen content in the oxygen containing gas stream is concentrated, and preferably greater than 85 vol. %. In some embodiments, the oxygen content in the oxygen containing gas stream is greater than 90 vol. %. In some embodiments, the oxygen content in the oxygen containing gas stream is greater than 93 vol. %. Almost all of the remaining gas in the oxygen containing gas stream is $N_2$ if the oxygen was concentrated out of atmospheric air. Very small amounts of other gases are present. For example, $CO_2$ from the ambient air would also be present in the oxygen containing gas stream in the low ppm range.

An advantage of VPCs is they can operate at near stoichiometric combustion. This means that the oxygen content in the combustion gas exiting the VPC has a very low oxygen content. In some embodiments, the oxygen content in the combustion gas is less than 4 vol. % $O_2$. In some embodiments, the oxygen content in the combustion gas is less than 3 vol. % $O_2$. In some embodiments, the oxygen content in the combustion gas is less than 2 vol. % $O_2$. Oxygen content in the combustion gas can even be less than 1 vol. %. For many combustion technologies, oxygen in the combustion gas is often >5 vol. % and can even be as high as 10 vol. % or more. If a hydrocarbon is used as a fuel, most combustor technologies cannot operate at <2 vol. % $O_2$ in the combustion gas and still produce low CO content. The presence of large amounts of CO is an indicator of incomplete or inefficient combustion. At 2 vol. % $O_2$, CO can be <100 ppm. At <1 vol. % $O_2$, CO can be less than 300 ppm.

With an incoming oxygen containing gas stream >85 vol. % oxygen, combustion gas temperatures can exceed 2,400° C. At 90 vol. % oxygen, the temperature of the combustion gas exiting the VPC can reach as high as 3,000° C. or more.

At 94 vol. % oxygen, the temperature of the combustion gas exiting the VPC can reach as high as 3,300° C. or more.

Non-limiting examples of methods for concentrating oxygen from air to produce oxygen containing gas where the oxygen content is >85 vol. % oxygen include pressure swing absorption, membrane absorption, vacuum pressure swing absorption, ionic liquid-based absorption, specialized liquid chemical-based absorption, aqueous-salt gas absorption, and aqueous-suspended solid gas absorption.

The fuel used by the VPC may be $H_2$ gas. If hydrogen is used as the fuel, a fractionated portion of the hydrogen produced in pyrolysis separation of hydrogen and carbon is diverted to fuel the VPC to produce the heat necessary to drive the pyrolysis process which converts hydrocarbon into carbon and hydrogen. If $H_2$ is burned in the VPC to produce the heat for pyrolysis, steam will be the main gas constituent in the combustion gas along with some $N_2$ from the >85 vol,% $O_2$ gas stream needed for high temperature combustion. No $CO_2$ is produced when $H_2$ is burned. The balanced chemical reaction for stoichiometric combustion of $H_2$ is:

$$2H_2+O_2\rightarrow 2H_2O.$$

The fuel used by the VPC may be a hydrocarbon gas such as natural gas, methane, propane, etc. The fuel used may be a solid hydrocarbon fuel such as lignite coal, brown coal, sub-bituminous coal, bituminous coal, anthracite coal, where the coal is a dry powder with less than 1 wt. % moisture and a particle size less than 150 µm. The fuel used may be a solid hydrocarbon such as solid biowaste from drying forest waste, farm waste, sawdust, wood chip waste, human or animal feces waste, plastic waste, rubber waster, car tire waste, etc. where the solid hydrocarbon fuel is a dry powder with less than 1 wt. % moisture and a particle size less than 150 µm. The fuel used may be a liquid hydrocarbon such as gasoline, diesel, biodiesel, biofuels, waste cooking oils, etc.

Pyrolysis separation of carbon and hydrogen is accomplished when hydrocarbon feedstock is injected into the >2,400° C. combustion gas stream which exits the VPC. Since the $O_2$ content in the combustion gas from the VPC is very low, e.g., less than 2 vol. % and even more preferably less than 1 vol. %, there is very little $O_2$ to react with the hydrocarbon feedstock in the Hydrocarbon Pyrolysis Zone. A reaction between the hydrocarbon feedstock and trace $O_2$ within the >2,400° C. combustion gas stream will produce CO or $CO_2$ and result in a combustion gas stream that is essentially oxygen free. The absence of oxygen in the combustion gas stream reduces the amount of carbon produced by the pyrolysis separation of hydrogen and carbon.

The >2,400° C. combustion gas stream immediately heats the hydrocarbon feedstock to a temperature greater than 1,200° C. which causes the hydrocarbon feedstock to undergo pyrolysis. The sonic pulses of the VPC aid in energy transfer to efficiently and rapidly heat the hydrocarbon feedstock. The feed rate of the hydrocarbon feedstock is controlled such that the combustion gas stream and particles exit the Hydrocarbon Pyrolysis Zone with a temperature >1,200° C. In some embodiments, the combustion gas stream and particles exit the Hydrocarbon Pyrolysis Zone with a temperature >1,300° C. In some embodiments, the combustion gas stream and particles exit the Hydrocarbon Pyrolysis Zone with a temperature >1,400° C. In some embodiments, the combustion gas stream and particles exit the Hydrocarbon Pyrolysis Zone with a temperature >1,500° C. In some embodiments, the combustion gas stream and particles exit the Hydrocarbon Pyrolysis Zone with a temperature >1,600° C. In other words, if a larger quantity of hydrocarbon feedstock is combined with the combustion gas stream, there may be greater cooling of the combustion gas stream. Similarly, if a smaller quantity of hydrocarbon feedstock is combined with the combustion gas stream, there is less cooling of the combustion gas stream resulting in a greater temperature when the combustion gas stream and particles exit the Hydrocarbon Pyrolysis Zone. Likewise, a hotter combustion gas stream may be able to heat and process a greater quantity of hydrocarbon feedstock.

In some embodiments, the amount of hydrocarbon feedstock combined with the combustion gas stream is controlled such that the temperatures of the gas and particles exiting the Hydrocarbon Pyrolysis Zone are greater than 2,500° C. As the particle temperature exceeds 2,500° C., and preferably in the range of 2,700° C. to 3,000° C. or more, the solid carbon particles transition from a carbonized material to a layered graphitized material. Under these conditions, the solid carbon particles are >98% carbon as characterized by CHNSO analysis. The percent graphitization is >80% as characterized by X-Ray diffraction (XRD). Operating at sufficiently high temperatures to graphitize the solid carbon particles causes conversion of the hydrocarbon feedstock to a high value solid carbon material.

The higher the temperature of the combustion gas stream, the more work can be done on the incoming hydrocarbon feedstock because there is a greater temperature difference between the combustion gas temperature and the >1,200° C. at which the solid carbon product and gases exit the Hydrocarbon Pyrolysis Zone.

The residence time for the gases and particles in the Hydrocarbon Pyrolysis Zone is less than 30 seconds. In non-limiting embodiments, the residence time for the gases and particles in the Hydrocarbon Pyrolysis Zone is less than 30 seconds, 25 seconds, 20 seconds, 18 seconds, 16 seconds, 14 seconds, 12 seconds, 10 seconds, 9 seconds, 8 seconds, 7 seconds, 6 seconds, 5 seconds, 4 seconds, 3 seconds, 2 seconds, and 1 second, where any of the stated values can form an upper or lower endpoint of a range. The entire exposure time of the hydrocarbon feedstock to the high temperature may be greater than a second due to transport time within process system equipment.

The Hydrocarbon Feedstock may be hydrocarbon gas such as natural gas, methane, propane, etc. The Hydrocarbon Feedstock used may be a solid hydrocarbon fuels such as lignite coal, brown coal, sub-bituminous coal, bituminous coal, anthracite coal, where the coal is a dry powder with less than 1 wt. % moisture and a particle size less than 500 µm particles size. The Hydrocarbon Feedstock used may be a solid hydrocarbon such as solid biowaste from drying forest waste, farm waster, human or animal feces waste, etc. where the Hydrocarbon Feedstock is a dry powder with less than 1 wt. % moisture and a particle size less than 500 µm particles size. The fuel used may be a liquid hydrocarbon such as gasoline, diesel, biodiesel, biofuel, waste cooking oils, etc.

In the oxygen depleted Hydrocarbon Pyrolysis Zone, at temperatures in excess of 600° C. to 700° C., hydrocarbons begin to carbonize. A hydrocarbon is a molecule made at least of carbon and hydrogen. Methane is one of the simplest hydrocarbons with a molecular formula of $CH_4$ meaning each molecule of methane has one carbon atom and four hydrogen atoms. Carbonization of methane means that all the atoms other than carbon are driven off from the carbon atom leaving only carbon behind. In the case of methane, one atom of carbon and 4 atoms of hydrogen do not exit the process as atoms. Instead, other atoms of carbon find each other and form a carbon matrix consisting of 6 membered rings that extend to form a graphite-like layer. Multiple layers then stack upon one another until enough carbon atoms have united to no longer exist as a gas and/or vapor. Solid particles deposit from the gaseous and/or vapor phase to form submicron solid particles similar in morphology and properties to grades of carbon black. In contrast, the most common method for making carbon black from methane is the carbonization of methane in specialized incomplete combustions reactions where some of the methane is burned to produce heat to carbonize the remaining methane.

In the disclosed pyrolysis process, hydrocarbon is injected into a low oxygen content, high temperature combustion gas stream. There is virtually no $O_2$ to react with the hydrocarbon to burn it and produce heat, CO or $CO_2$, and $H_2O$. As noted above, the small amount of $O_2$ that is present (<1 vol. % of the combustion gas) will do this, but then the $O_2$ content is zero. In the $O_2$ depleted environment, the hydrocarbon carbonizes. In the case of methane, submicron particles of carbon black made almost completely of carbon form. There is no $O_2$ to burn the hydrogen atoms. As a result, the hydrogen atoms combine together into $H_2$ gas. The product of the pyrolysis reaction is solid carbon and $H_2$ gas. If the temperature for the gases and carbon solids exiting the Hydrocarbon Pyrolysis Zone is greater than 1,200° C., carbonization approaches completion where the hydrocarbon is separated into $H_2$ gas and solid carbon particles.

If the Hydrocarbon Feedstock is a solid, then hydrocarbon gases, hydrocarbon vapors, $H_2$ gas, start to destructively distill from the Hydrocarbon Feedstock solid at temperature approximately greater than 300° C. The hydrocarbon gases may be methane, ethane, propane, etc. The hydrocarbon vapors can range from coal tar vapor to vapors of smaller organic compounds such as ring structures like benzene, multi-ring organic molecules, and molecules that would be liquids at room temperatures such as ethanol, methanol, decane, etc. These organic molecules are examples of solid and liquid hydrocarbons that may destructively distill from the coal particle and be present in the vapor phase. As these gases and vapors heat to >1,200° C., they carbonize and produce $H_2$ gas, other carbonization gases, and submicron particles similar to carbon black, as was formed from the methane gas described above.

Larger solid char particles remain from the solid hydrocarbon feedstock particles. As these char particles increase in temperature to greater than 1,200° C., they carbonize and produce $H_2$ gases, other carbonization gases, and large carbon particles from the char particles.

It should be noted that a solid hydrocarbon such as dry coal or dry plant matter or dry feces has a much more complex molecular structure than the simple $CH_4$ of methane. Such solid hydrocarbons are usually characterized in an instrument that measures the wt. % of carbon (C), hydrogen (H), nitrogen (N), and sulfur (S). Oxygen (O) wt. % is then obtained by subtracting the sum of C, H, N, and S wt. %'s from 100 wt. %. Some call this CHNSO Analysis. The other carbonization gases mentioned above are gases containing N, S, and O that are driven from the carbon matrix as it carbonizes to become more and more pure carbon.

If the Hydrocarbon Feedstock is a liquid hydrocarbon, such as diesel, the liquid hydrocarbon is sprayed in into the >2,400° C. combustion gas stream as fine droplets, preferably with a droplet size less than 500 μm. The fine droplets of the liquid hydrocarbon vaporize immediately. As the liquid hydrocarbon vapor heats to greater than 1,200° C., it carbonizes and produces $H_2$ gas. A small amount of other carbonization gases are also produced to the extent that atoms N, S, and O are present in the liquid hydrocarbon molecular structure. Submicron particles are produced similar to the carbon black which is formed from methane gas. A small amount of larger carbon char particles may also form.

Regardless of the Hydrocarbon Feedstock material, carbon particles that reach >1,200° C. will be greater than 90 wt. % carbon in CHNSO Analysis. For most Hydrocarbon Feedstocks, carbon content will be greater than 95 wt. % when the carbon particles reach >1,200° C.

After the Hydrocarbon Pyrolysis Zone, the particle laden gas stream goes to a Heat Exchanger that reduces the gas and particle temperature to <200° C. In some embodiments, the Heat Exchanger reduces the gas and particle temperature to less than 200° C., less than 175° C., less than 150° C., less than 125° C., or less than 100° C., where any of the stated values can form an upper or lower endpoint of a range. Taking into consideration the Ideal Gas Law and the equation PV=nRT, where P is pressure, V is volume, n is the number of gas moles, R is the Ideal Gas Constant, and T is the temperature in Kelvin, reducing the temperature from 1,200° C. to 200° C., under constant pressure, will result in a volume reduction of about 3.1 times, $T_{in}/T_{out}=(1200+273.15)/(200+273.15)=3.1$. The volume reduction resulting from cooling the gasses allows for smaller downstream pipes and equipment, including Gas Particles Separators, Gas Handling Machines, Gas Scrubber, Gas Adsorption, etc. The maximum temperature for continuous operation of a baghouse which is a type of Gas Particle Separator is generally less than 200° C. based on the bag material available.

The heat captured from the Heat Exchanger has value which can be used to perform work and otherwise make the disclosed process more efficient. Non-limiting uses of the recovered heat include preheat gas or raw materials and create superheated steam to drive a turbine to produce electricity.

Figure 2:
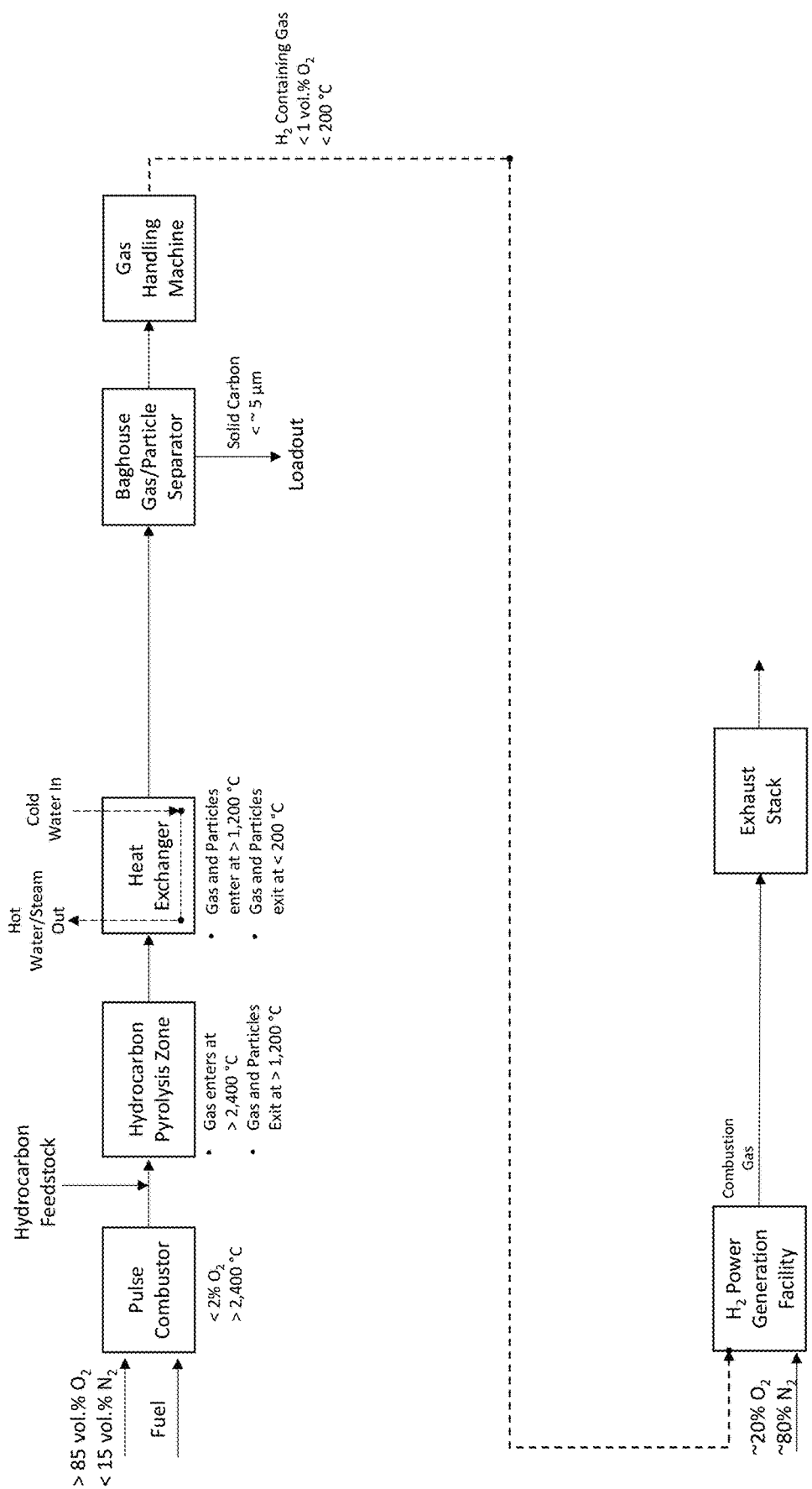
FIG. 2 shows the process of FIG. 1 with the Cyclone Gas/Particle Separator omitted.

The cooled particle laden gas then goes downstream to goes to Gas/Particle Separation equipment. Usually, a cyclone will be used followed by a baghouse as shown in FIG. 1. In cases where all the particles are so small that almost none of them would exit the underflow of a cyclone, then only a baghouse would be used as shown in FIG. 2.

The carbon particles that reached >1,200° C. in the Hydrocarbon Pyrolysis Zone are mostly an amorphous solid of sp2 carbon where three carbons are connected by two single bonds and one double bond. Placing the probes of an ohm meter on the particle demonstrates their resistance less than about 20 ohms at 1 cm separation. The 1 cm separation between the probes of the ohm meter is spanned by many particles of the powder carbon product. The bulk density may be too low for physical electrical connection between the particles. Compressing the powder to greater bulk density may be necessary to measure the electrical resistance of the carbon particles, especially the low bulk density carbon black-like particles collected from the baghouse. The sp2 bonds are not ordered but instead connect carbon atoms in the particle together as an amorphous solid. X-ray diffraction may show the beginning of layered structures that would be considered low level graphitization. The temperature for significant graphitization was not reached in the Hydrocarbon Pyrolysis Zone.

Figure 3:
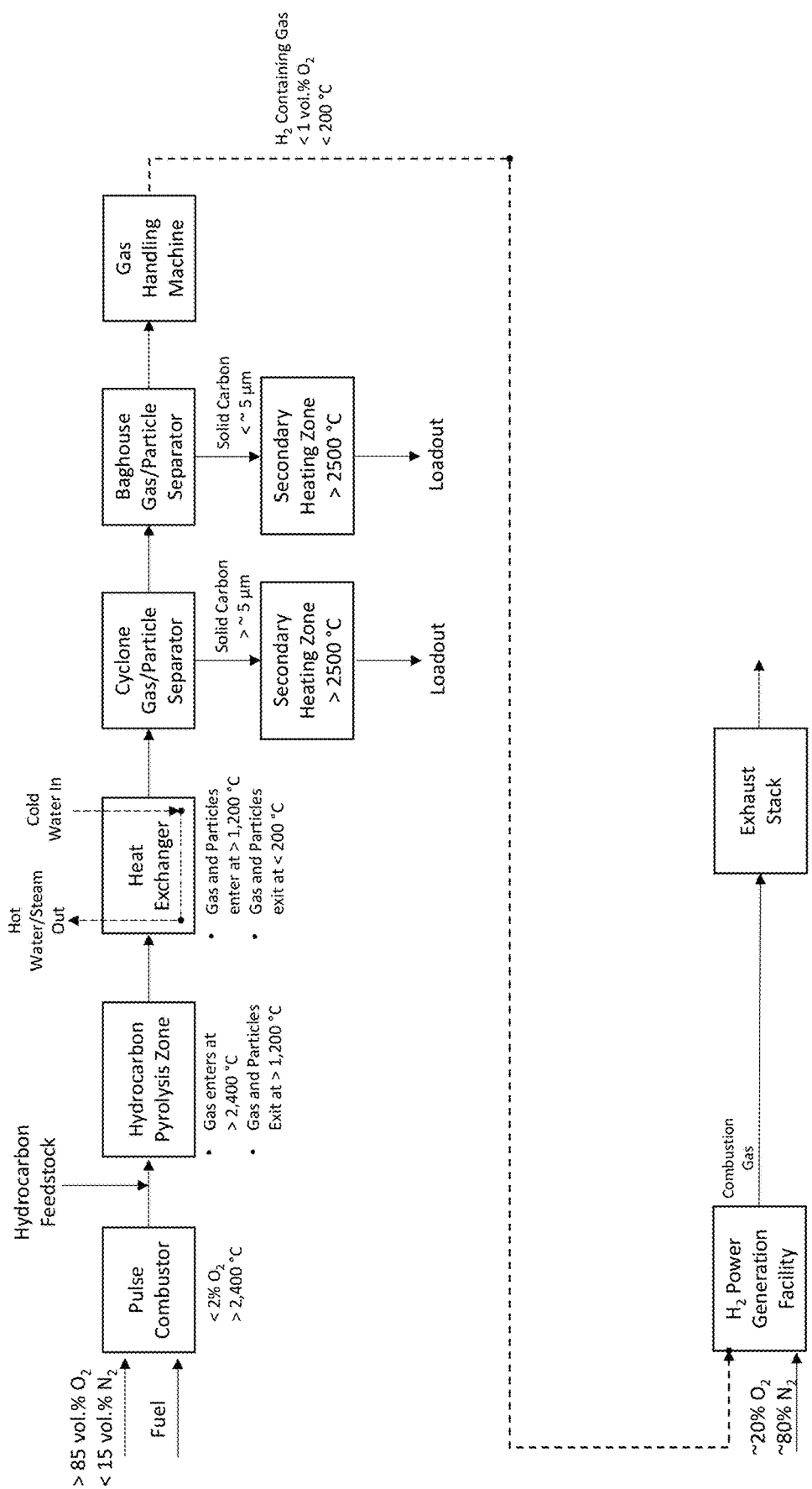
FIG. 3 shows the process of FIG. 1 with an optional Secondary Heating Zone for the carbon particles exiting the underflow of the Cyclone Gas/Particle Separator and the Baghouse Gas/Particle Separator.

FIG. 3 shows an optional addition to the process of FIG. 1 where the carbon particles exiting the underflow of a cyclone and/or a baghouse or some other Gas/Particles Separator equipment proceed into a Secondary Heating Zone. The carbon particles are raised to a temperature of >2,200° C. in a residence time less than 10 minutes, preferably less than 5 minutes, and even more preferably less than 2 minutes in the secondary heating zone. The heat source for the Secondary Heat Zone may be any means that can heat the carbon particles to the target temperature. One preferred method is an induction furnace. Another preferred method is an electric arc furnace. Heating the carbonized coal particles to >2,200° C. drives a reorganization of the amorphous structure to a layered graphite structure. The graphitized carbon can find use as a feedstock into higher value markets such as carbon refractory parts, carbon electrodes, battery production for the growing car and grid storage markets, etc.

Referring again to the process shown in FIG. 1, the cooled and particle free gases then go to a Gas Handling Machine. This machine might be a single-stage, two-stage, or multiple-stage centrifugal fan. This machine might be a positive displacement blower. This machine might be a high volume gas compressor such as a screw compressor. The particular type of Gas Handling Machine will be selected based on the requirements of the overall system as specified by the vacuum needed on the upstream portion of the system and the pressure needed by the downstream portion of the system. In FIG. 1, the Gas Handling Machine is located after the Gas/Particle Separator Equipment in the Pyrolysis Separation of Hydrogen and Carbon Process and before downstream equipment that might be present in the process and before the $H_2$ Containing Gas point of use facility, such as the Power Production Facility shown in FIG. 1.

Figure 4:
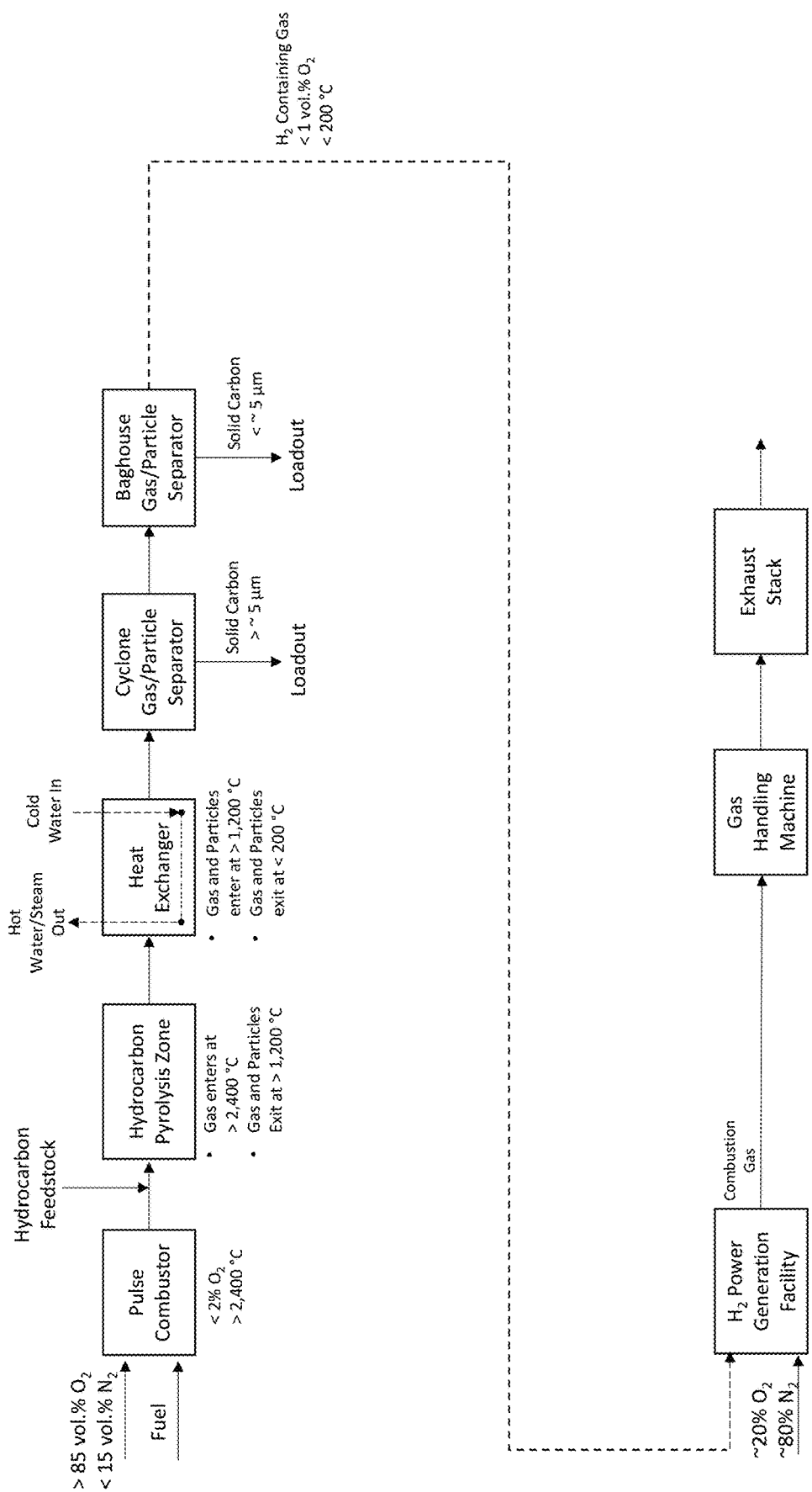
FIG. 4 shows the process of FIG. 1 with an alternative location for the Gas Handing Machine placed at the end of the process after combustion of the $H_2$ Containing Gas at an $H_2$ Power Generation Facility.

FIG. 4 shows an alternative location for the Gas Handing Machine where it is placed at the end of the combined Pyrolysis Separation of Hydrogen and Carbon Process plus the combustion of the $H_2$ Containing Gas at an $H_2$ Power Generation Facility.

In FIG. 1, the cooled and particle free $H_2$ Containing Gas is transported to the nearby $H_2$ Power Generation Facility where it is combusted in the presence of air that is about 20 vol. % $O_2$ and 80 vol. % $N_2$. If there is any fugitive CO in the gas stream, it will be burned to $CO_2$. Any other fugitive S or N, other than $N_2$, gases that are not oxides will likely be burned to their oxide form as well. The $H_2$ Power Generation Facility may be a power generation facility that originally burned coal or a liquid hydrocarbon, but which has undergone a conversion to burn hydrogen in the combustor instead of the previous fuel. In this way, the infrastructure and capital spent on the facility is preserved.

The $H_2$ Power Generation Facility may burn $H_2$ to produce superheated steam which drives a turbine to produce electricity. The $H_2$ Power Generation Facility may burn $H_2$ and use the combustion gas to directly drive a turbine to produce electricity.

In the system described in FIG. 1, the $CO_2$ emissions are minimized to the $CO_2$ produced when burning a hydrocarbon in the VPC to produce the heat for the process, $CO_2$ produced when carbonizing the Hydrocarbon Feedstock that has oxygen as part of the carbon matrix, and $CO_2$ produced in a Water-Gas Shift Reaction. The Water-Gas Reaction is the chemical reaction of steam in the high temperature combustion gas with carbon to produce $H_2$ and CO. The mixture of $H_2$ and CO is called Water-Gas because this gas blend is a product of the reaction between carbon and water. The Water-Gas Shift Reaction is the reaction between CO and steam to produce $H_2$ and $CO_2$. It is called the Water-Gas Shift Reaction for historical reasons surrounding the development of this reaction to convert CO in Water-Gas to $H_2$ and $CO_2$ by exposing the CO in Water-Gas to steam. Thus the Water-Gas with a composition of CO, $H_2$, and probably some $CO_2$ is "shifted" to be predominantly $CO_2$, $H_2$, and probably some CO. Combustion steam can react with carbon in the form of carbon gases, carbon vapors, and solid carbon to yield Water-Gas, e.g. $H_2$ and CO. Steam in the combustion gas can shift the CO of this water gas or CO produced when during carbonization of hydrocarbons containing 0 in the organic matrix to $H_2$ and $CO_2$. The $CO_2$ that is produced via the above-described process is less than or approximately equal to the $CO_2$ produced if the original fuel was burned to run a power plant, depending on the efficiency of the power plant. This process also produces a carbon product that can be sold into existing markets or future markets as already discussed.

The combustion exhaust gas from the $H_2$ Power Generation Facility can exhaust to the air as shown in FIG. 1 through the Exhaust Stack. The combustion gas is almost all steam and unreacted $N_2$ from the incoming air, according to the following combustion reaction:

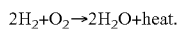

$$2H_2+O_2\rightarrow 2H_2O+\text{heat}.$$

Figure 5:
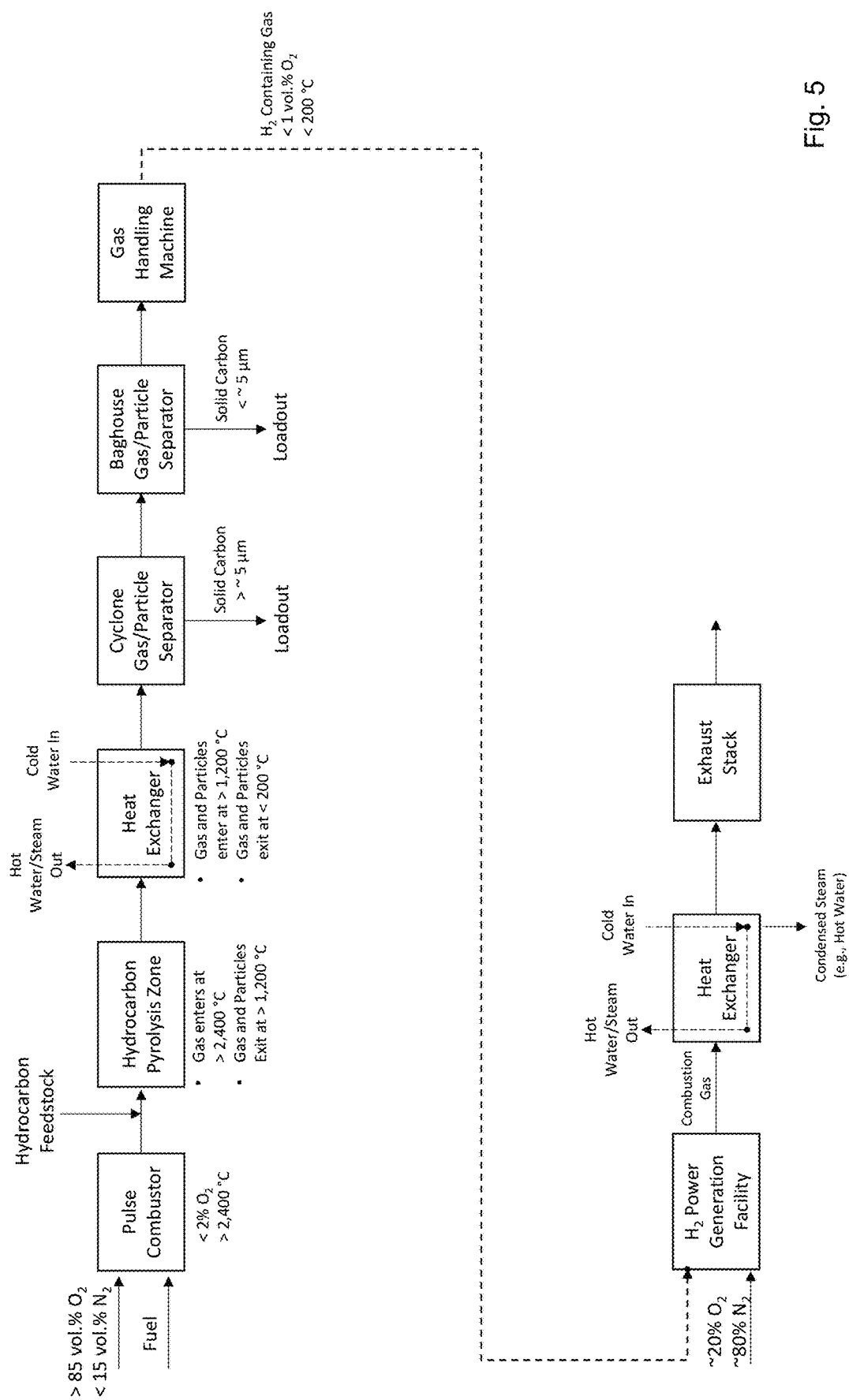
FIG. 5 shows the process of FIG. 1 with a heat exchanger installed after the $H_2$ Power Generation Facility.

Alternatively, as shown in FIG. 5, a highly efficient Heat Exchanger can be installed after the $H_2$ Power Generation Facility to cool the exhaust gas temperature to below 100° C., thus condensing and saving the considerable amount of water from the steam in the combustion gas. The Heat Exchanger can produce a super-heated steam which can be used to produce electricity with a secondary turbine if one were installed. By installing a secondary turbine or a number microturbines, the $H_2$ Power Generation Facility will start to approach the efficiency of a combined cycle natural gas fired power plant rather than the lower efficiency at which the coal or liquid hydrocarbon power plant originally performed.

The $H_2$ Containing Gas that exits the Pyrolysis Separation of Hydrogen and Carbon process has some $N_2$ in it from the >85 vol. % oxygen containing gas stream used to combust the hydrocarbon in the VPC. There will be some $CO_2$ from combustion of the hydrocarbon fuel in the VPC. Carbonization of the hydrocarbon can also produce CO and/or $CO_2$ if there is oxygen present in the molecular structure. Combustion water produced when burning the hydrocarbon fuel will likely react with the Hydrocarbon Feedstock in the high temperature Pyrolysis Zone to produce CO and $H_2$ and/or more preferably $CO_2$ and $H_2$. See the previous discussion on the Water-Gas Reaction and the Water-Gas Shift Reaction.

Figure 6:
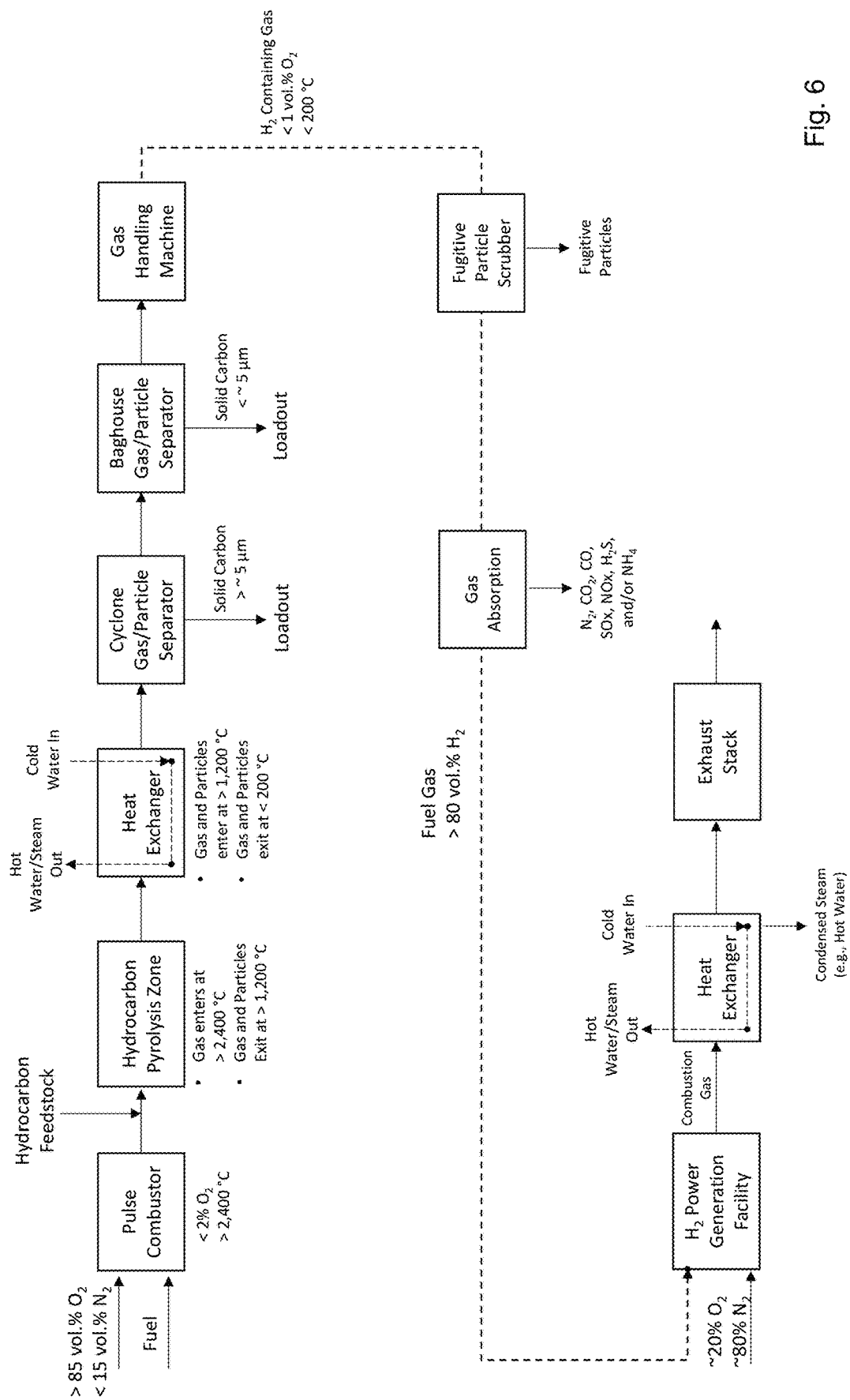
FIG. 6 shows the process of FIG. 5 with a fugitive particle scrubber and gas absorption equipment installed between the Pyrolysis Separation of Hydrogen and Carbon process and the $H_2$ Power Generation Facility.

FIG. 6 shows a configuration where optional equipment is installed between the Pyrolysis Separation of Hydrogen and Carbon process and the $H_2$ Power Generation Facility to remove unwanted particles and gases to provide a >90 vol. % $H_2$ gas stream to the $H_2$ Power Generation Facility. One set of equipment that may be used includes a Fugitive Particle Scrubber. A combination of a cyclone and baghouse separates >99% of the particles from the gas stream. Some fugitive particle emissions may pass through the baghouse. This is particularly true when a process makes sub-micron carbon black-like particles. If fugitive particles are undesirable for the Gas Absorption Equipment, a Fugitive Particle Scrubber can be installed. The scrubber could be one of the many water-spray based scrubber designs. Another example of a scrubber that could be used is an electrostatic precipitator. These two suggestions are non-limiting examples.

After the Fugitive Particles are removed, Gas Absorption Equipment removes other gases besides $H_2$ to produce a greater than 80 or 90 vol. % $H_2$ gas stream for the $H_2$ Power Generation Facility. Gases that may be removed are $N_2$, $CO_2$, CO, SOx, NOx, $H_2S$, $NH_4$, etc. These are non-limiting examples of gases that may be removed with gas absorption equipment. The method for gas adsorption may include pressure swing absorption, membrane absorption, vacuum pressure swing absorption, ionic liquid-based absorption, ammonia liquid-based absorption, aqueous-salt gas absorption, aqueous-suspended solid gas absorption, etc. These are non-limiting examples.

Many of the removed gases have value in chemical industries. Thus, the absorbed gases that are removed from the $H_2$ containing Gas can be stored on-site until loadout is full and then shipped out as a product. $CO_2$ can be sold into the food processing industry or sequestered by various techniques to keep it from entering into the atmosphere as a greenhouse gas.

A greater than 90 vol. % $H_2$ gas stream that has had fugitive particles removed is an ideal fuel to be used in a new, highly efficient turbine-based combustion combined cycle $H_2$ Power Plant rather than conversion of existing coal fired and liquid hydrocarbon fired power plants.

Figure 7:
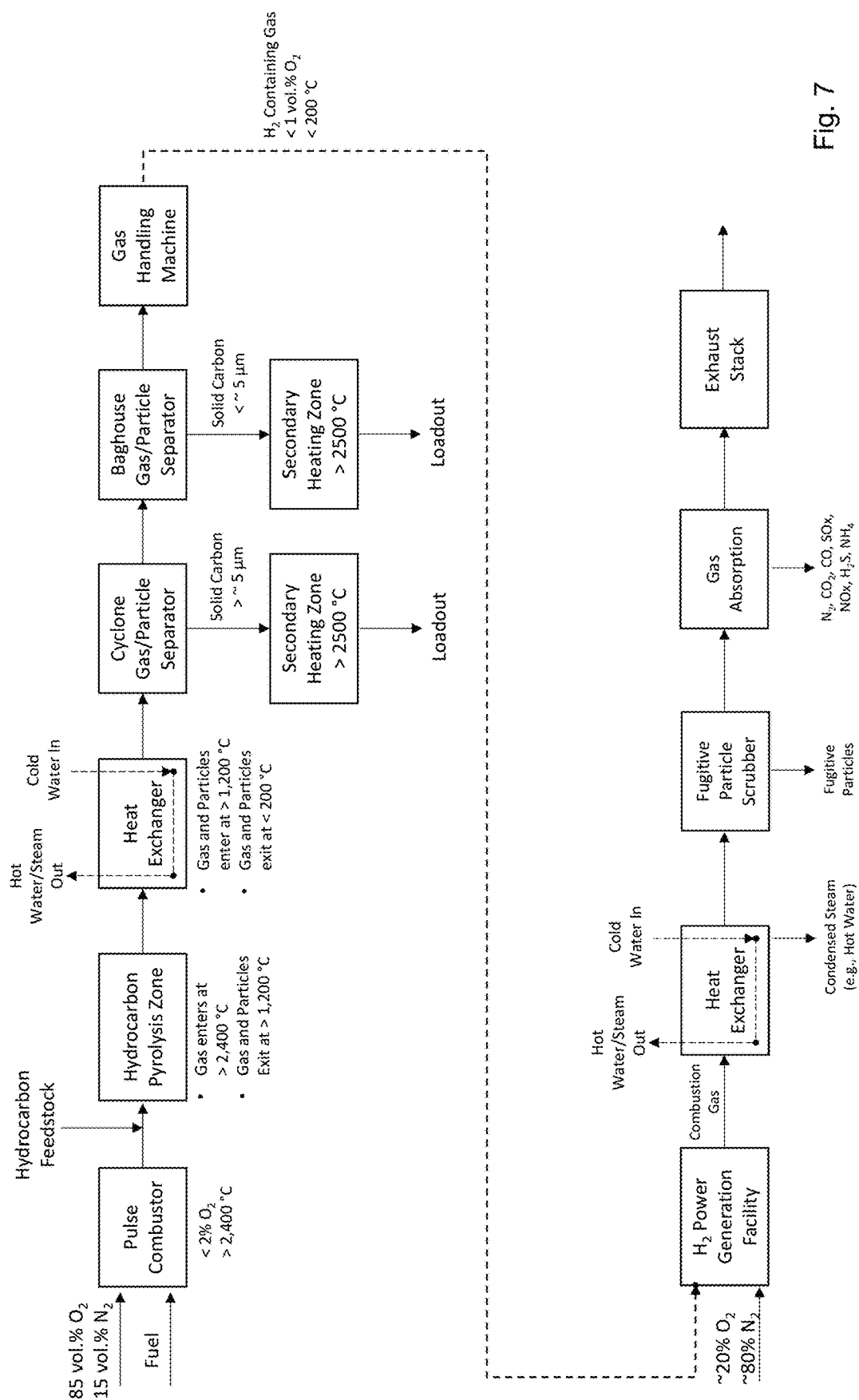
FIG. 7 shows the process of FIG. 5 with the fugitive particle scrubber and gas absorption equipment installed after the $H_2$ Power Generation Facility.

An alternative equipment installation is shown in FIG. 7. The Secondary Heat Zone is shown to indicate that the Secondary Heat Zone can be present or not present in any configuration depending on whether a carbonized product or a graphitized product is desired. This equipment shows that a Fugitive Particle Scrubber and Gas Absorption Equipment could be installed after the $H_2$ Power Generation Facility as an alternative option. One example where this configuration might be done would be in a converted coal fired power plant or liquid hydrocarbon fired power plant. The converted power plant burns the $H_2$ Containing Gas. The end goal is to limit $CO_2$ and other gas emissions as much as possible. Thus, the gas absorption equipment could be installed after the $H_2$ Power Generation Facility to absorb $CO_2$ and other target gases that are in the combined exhaust gas from the continuous process from the Pyrolysis Separation of Hydrogen and Carbon all the way through the combustion of the $H_2$ Containing Gas.

Figure 8:
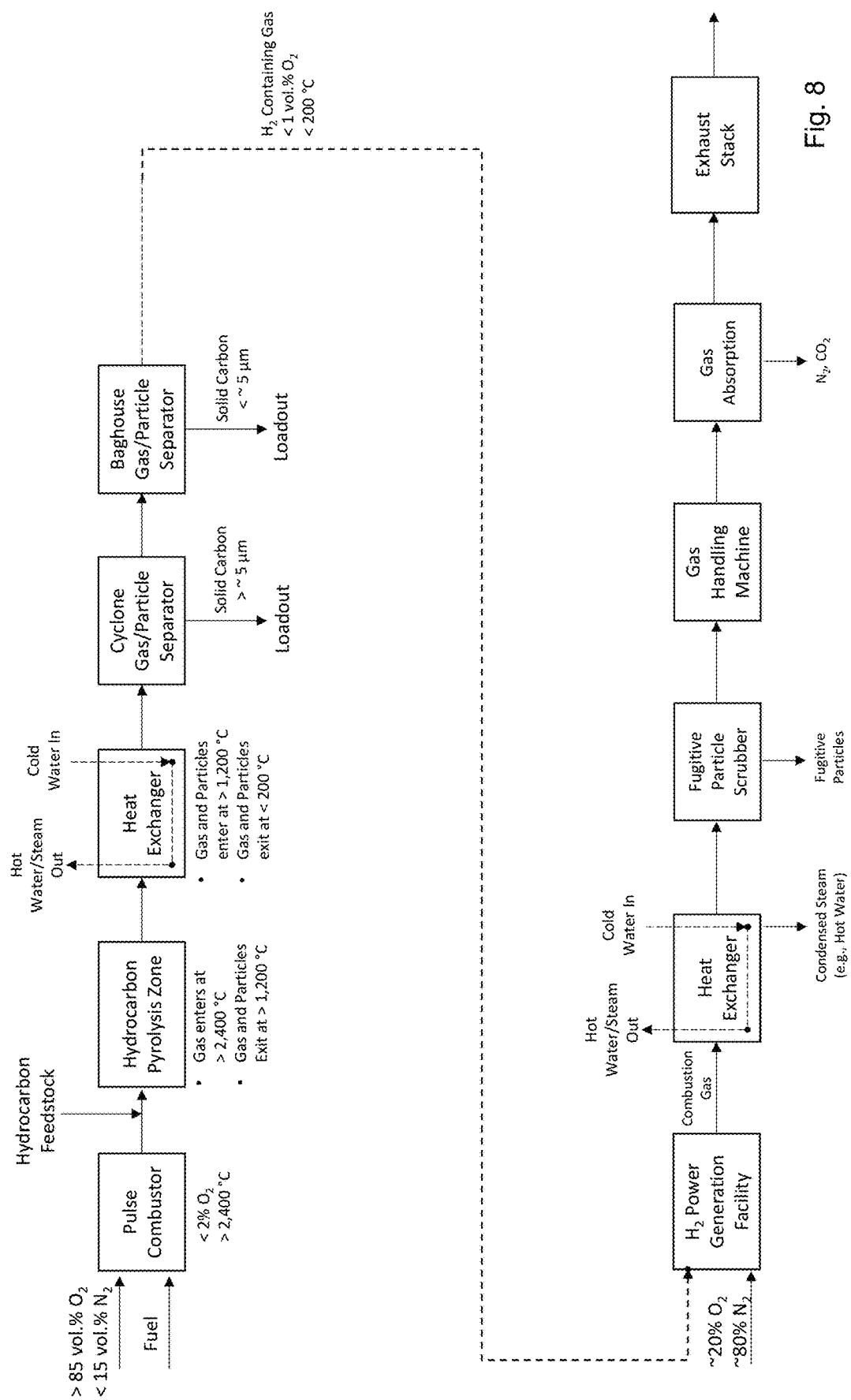
FIG. 8 shows a variation to the equipment arrangement shown in FIGS. 4 and 7 where the equipment modules can be moved around in the process based on design goals. As shown, the Gas Handling Machine is moved to near the end of the process between the Fugitive Particle Scrubber and the Gas Absorption Equipment.

FIG. 8 is an alternative to FIG. 7 as well as a variation to FIG. 4 showing that the equipment modules can be moved around in the process based on design goals. The Gas Handling Machine is moved to near the end of the process between the Fugitive Particle Scrubber and the Gas Absorption Equipment. The type of Gas Handling Machine would be chosen based on the vacuum level needed for the upstream equipment and the pressure for the downstream equipment. A reason to put the Gas Handling Machine in the location is because high pressure may be needed for the Gas Adsorption equipment. Potentially, a Gas Handling Machine may still be needed in the location shown in FIG. 1 for the basic process after the Pyrolysis Separation of Hydrogen and Carbon.

Figure 9:
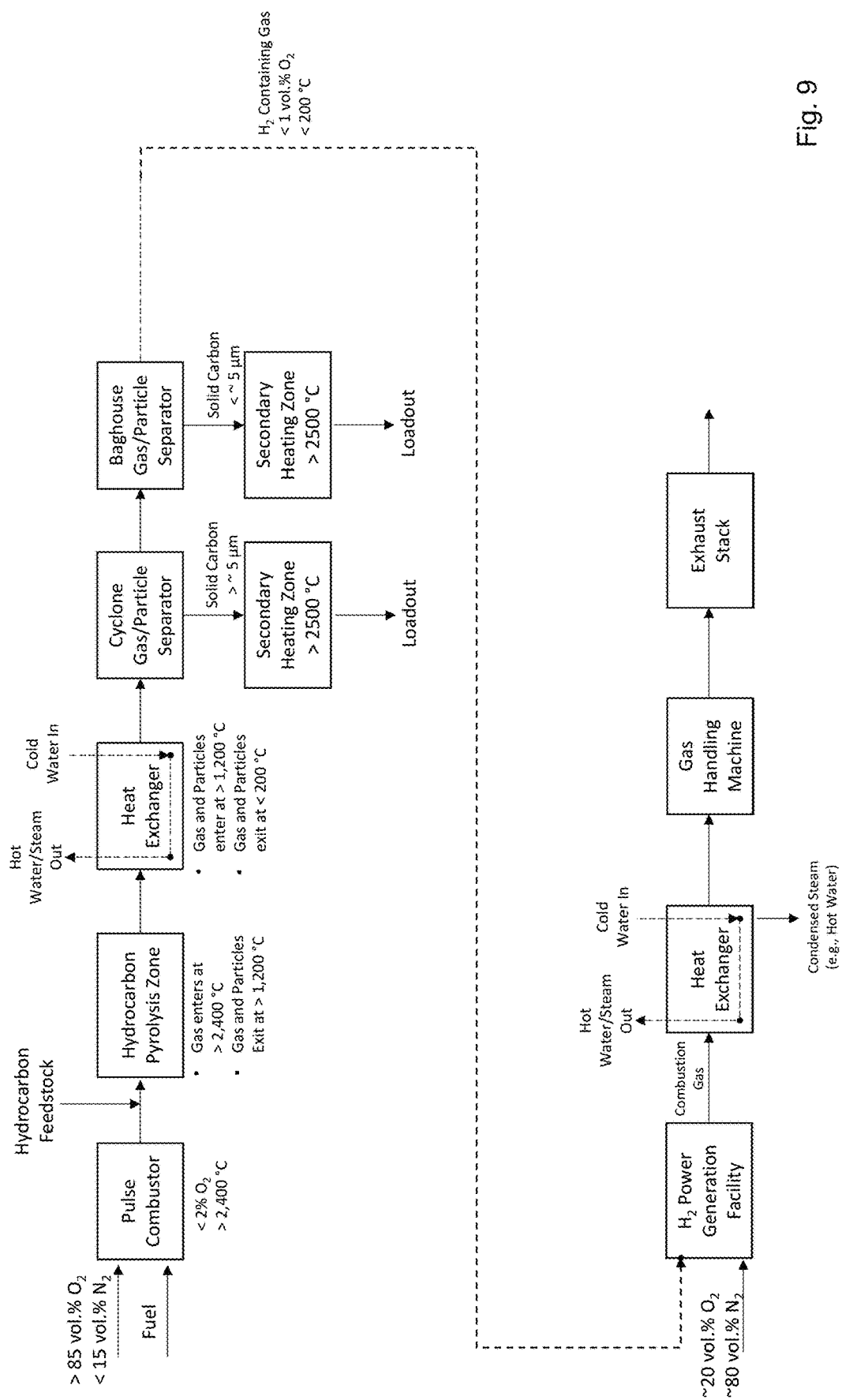
FIG. 9 shows a variation to the equipment arrangement shown in FIGS. 3 and 5 where the Gas Handling Machine is moved to near the end of the process.

FIG. 9 is an alternative that is a variation of the equipment arrangements in FIG. 3 and FIG. 5. The Secondary Heat Zone is shown to indicate that the Secondary Heat Zone can be present or not present in any configuration depending on whether a carbonized product or a graphitized product is desired. A Gas Handling Machine is moved to near the end of the process.

Figure 10:
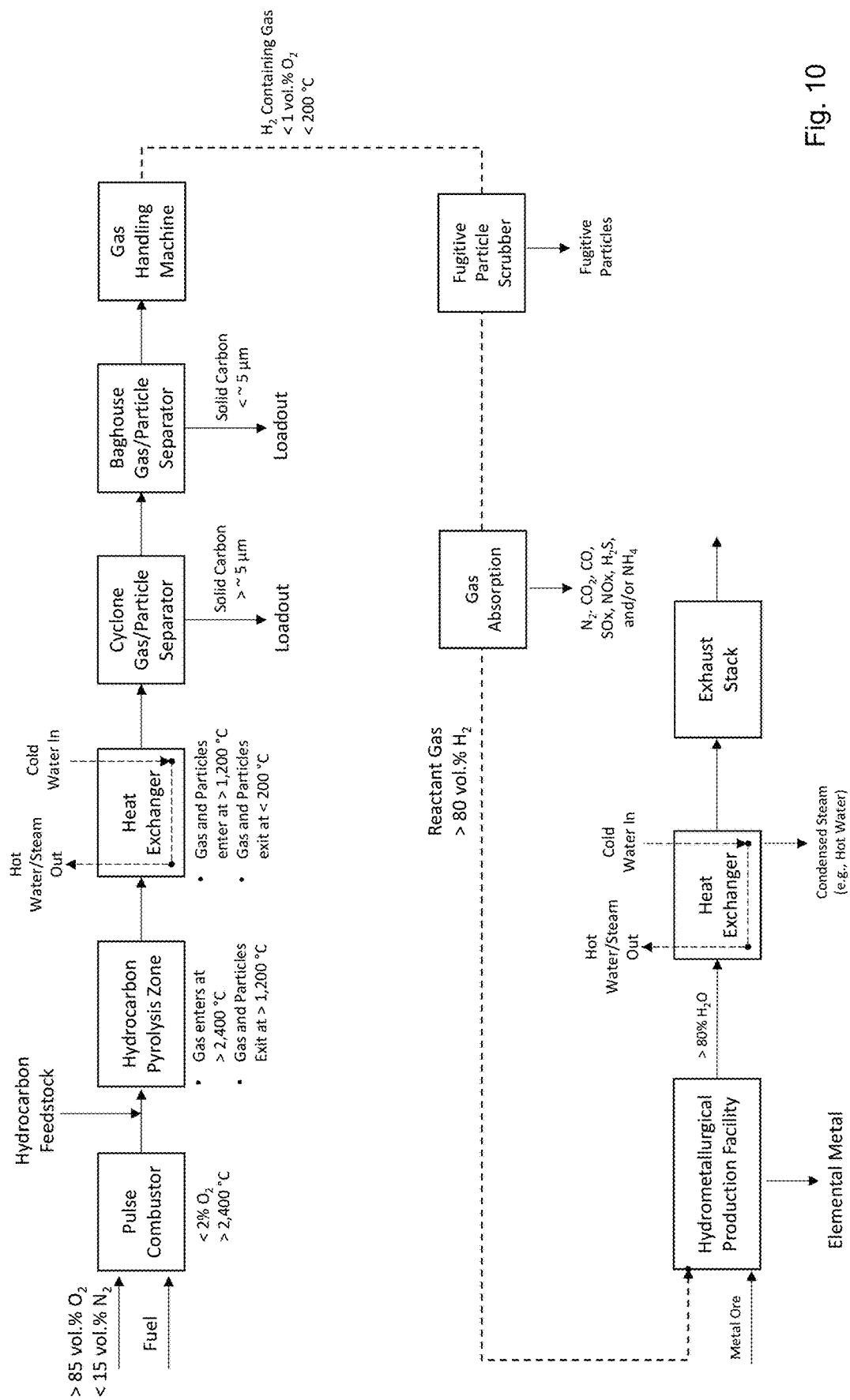
FIG. 10 shows a variation to the process of FIG. 6 where the $H_2$ containing Reactant Gas is supplied to a Metal Production Facility.

FIG. 10 is a variation of FIG. 6. After the Pyrolysis Separation of Hydrogen and Carbon, Fugitive Particle Scrubber equipment and Gas Absorption equipment produces a greater than 80 vol. % $H_2$ containing Reactant Gas. The >80 vol. % $H_2$ containing Reactant Gas can be used as a reactant in a Metal Production Facility. In metal production, $H_2$ is used as the reductant to produce elemental metal from metal ore. Sequestration of the $CO_2$ absorbed from the $H_2$ Containing Gas makes this a commercial metal production process with reduced, low, or very low $CO_2$ (greenhouse gas) emissions depending on the capacity of gas absorption equipment.

Figure 11:
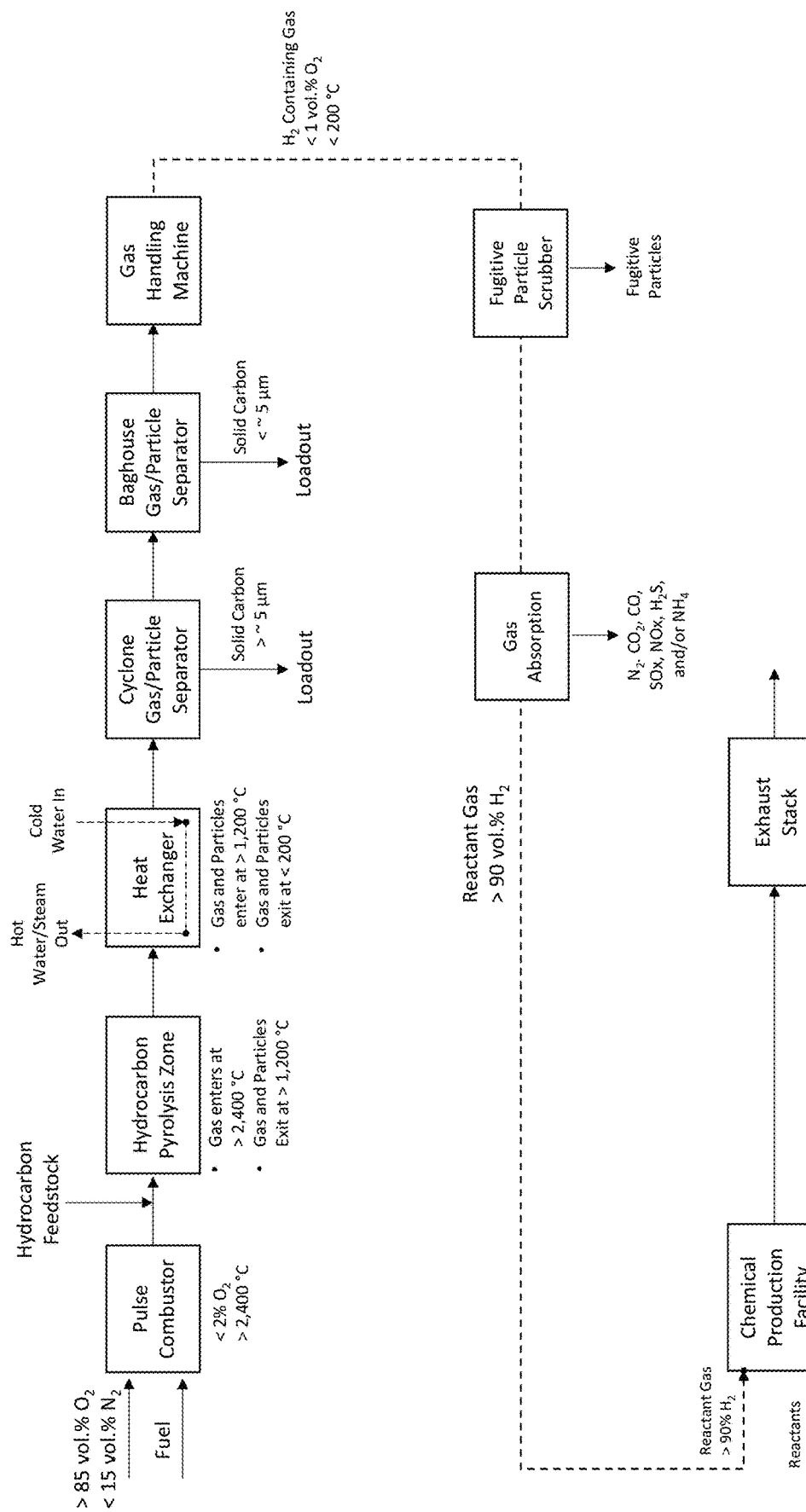
FIG. 11 shows a variation to the process of FIG. 6 where the $H_2$ containing Reactant Gas can be used as a reactant in a Chemical Production Facility.

FIG. 11 is a variation on FIG. 6. After the Pyrolysis Separation of Hydrogen and Carbon, Fugitive Particle Scrubber equipment and Gas Absorption equipment produces a >90 vol. % $H_2$ containing Reactant Gas. The >90 vol. % $H_2$ containing Reactant Gas can be used as a reactant in a Chemical Production Facility. An example of a commercial process that requires a lot of hydrogen is ammonia production. Sequestration of the $CO_2$ absorbed from the $H_2$ Containing Gas makes this a chemical production process with reduced, low, or very low $CO_2$ (greenhouse gas) emissions depending on the capacity of gas absorption equipment.

It should be understood that the disclosed invention is not limited to the specific equipment arrangements shown in FIGS. 1-11. It should be understood that the equipment modules can be moved around in the process variations based on design goals of the disclosed invention.

Other features and advantages of the present invention are apparent from the different examples that follow. The examples below illustrate different aspects and embodiments of the present invention and how to make and practice them. The examples do not limit the claimed invention. Although methods and materials similar or equivalent to those described herein can be used in the practice of the present invention, suitable methods and materials are described below. Based on the present disclosure the skilled artisan can identify and employ other components and methodology useful for practicing the present invention.

Example 1

600 MW is a common size for a Coal-Fired Power Plant. The results for calculations that convert the heat in Btu/hr needed to produce 600 MW electricity at a 35% efficient Coal-Fired Power Plant are found in Table 1. Calculations summarized in Table 2 show that in order to operate a 35% efficient 600 MW Coal-Fired Power Plant burning the same coal used as the feedstock for the Pyrolysis Separation of Hydrogen and Carbon, 210.63 MTPH coal needs to be burned. An efficiency of 35% is an average to high efficiency for a coal fired power plant. Table 2 summarizes calculations which show 210.63 MTPH as-received 10% moisture coal are burned to operate a 35% efficient 600 MW Coal-Fired Power Plant.

TABLE 1

Convert 600 MW electricity to MM Btu/hr heat needed to produce electricity at a 35% efficient Coal-Fired Power Plant.

| | |
|---|---|
| 600 | MW per hour Power Plant |
| 35% | efficiency for standard Coal Power Plant |
| 1,714 | MW/hr actual production |
| 3,412,141 | Btu/MW |

TABLE 1-continued

Convert 600 MW electricity to MM Btu/hr heat needed to produce electricity at a 35% efficient Coal-Fired Power Plant.

| | |
|---|---|
| 5,849,384,571 | Btu/hr for 600 MW Power Plant |
| 5.12E+07 | MM Btu/yr for 600 MW Power Plant |

TABLE 2

MTPH of Coal needed to operate a 35% efficient 600 MW Coal-Fired Power Plant

| | |
|---|---|
| 14,000 | Btu/lb Dry Coal 5% Ash Coal |
| 10% | Moisture of Wet Bailey Coal |
| 12,600 | Btu/lb As-received coal @10% moisture |
| 2.78E+07 | Btu/MT coal |
| 210.63 | MTPH Wet Coal |
| 1,845,152 | MT Coal/yr |

The model coal is 5.0 wt. % ash and 10.0 wt. % moisture. 210.63 MTPH As-received coal*(1-10.0% moisture)*(1-5.0% ash) 180.09 moisture ash free (MAF) coal. Table 3 shows a mass balance that calculates the MTPH of $CO_2$ produce when 210.63 MTPH of as-received coal with the CHNSO values shown is burned. The coal is the same that is used as a feedstock into the Pyrolysis Separation of Hydrogen and Carbon to produce enough $H_2$ gas to operate an on-site 41% efficient $H_2$ Power Generation Facility. 533.42 MTPH $CO_2$ are produced when the 210.63 MTPH As-received coal or 180.09 MTPH MAF coal are burned. 533.42 MTPH $CO_2$ represents the amount of $CO_2$ that would be produced if 210.63 MTPH of the as-received coal were burned at a 35% efficient 600 MW Coal-Fired Power Plant.

The negative value of $O_2$ represents the amount of $O_2$ that is needed to stoichiometrically react with each element in the coal and burn it to the oxide form. The total amount of oxygen needed to burn the coal is 452.50 MTPH.

TABLE 3

Mass balance for burning MAF Coal at a 35% efficient 600 MW Coal-Fired Power Plant.

| Element | wt. % | MTPH | $C + O_2 \rightarrow$ $CO_2$ | $4H + O_2 \rightarrow$ $2H_2O$ | $2N + O_2 \rightarrow$ $2NO$ | $S + O_2 \rightarrow$ $SO_2$ | Total MTPH |
|---|---|---|---|---|---|---|---|
| Carbon | 80.78% | 145.48 | −145.48 | | | | 0.00 |
| Hydrogen | 5.24% | 9.44 | | −9.44 | | | 0.00 |
| Nitrogen | 1.74% | 3.13 | | | −3.13 | | 0.00 |
| Sulfur | 2.09% | 3.76 | | | | −3.76 | 0.00 |
| Oxygen | 10.15% | 18.28 | −18.28 | | | | 0.00 |
| | | 180.09 | | | | | 0.00 |
| $CO_2$ | | | 533.42 | | | | 533.42 |
| $H_2O$ | | | | 84.93 | | | 84.93 |
| $O_2$ | | | −369.66 | −75.49 | −3.58 | −3.76 | −452.50 |
| NO | | | | | 6.71 | | 6.71 |
| $SO_2$ | | | | | | 7.53 | 7.53 |
| | | | 0.00 | 0.00 | 0.00 | 0.00 | |

Example 2

A Mass Balance for Pyrolysis Separation of Hydrogen and Carbon using Pittsburgh 8 Seam Coal as the Feedstock that produces enough $H_2$ containing Fuel Gas to power a 600 MW Hydrogen Power Plant operating at 41% efficiency is shown in Table 4. CHNSO analysis of the coal feedstock was 80.78 wt. % Carbon, 5.24 wt. % Hydrogen, 1.74 wt. % Nitrogen, 2.09 wt. % Sulfur, and 10.15 wt. % Oxygen by difference on a MAF basis. The preferred moisture and ash of the coal feedstock into the Pyrolysis Separation of Hydrogen and Carbon Process is <1 wt. % moisture and <10% ash. The mass balance that is summarized in Table 4 used 610.55 MTPH of coal feedstock at 0.5% moisture and at 5.0% ash. A moisture of 0.5% or less is a more preferred embodiment. An ash content of 5% or less is a preferred embodiment. The Mass Balance summarized in the Table 4 below matches up with FIG. 6 which shows the combination of the Pyrolysis Separation of Hydrogen and Carbon, gas absorption, and burning of the $H_2$ Containing Fuel Gas at an adjacent or on-site $H_2$ Power Generation Facility where the $H_2$ is produced on site with no long-term storage and very short transportation of the $H_2$ gas.

If no $CO_2$ gas absorption is done, then the mass balance summary in Table 4 shows that 307.5 MTPH of $CO_2$ is produced by the Pyrolysis Separation of Hydrogen and Carbon that is coupled to a 41% efficient 600 MW $H_2$ Power Generation Facility. The mass balance for burning coal in Table 3 shows that a 35% efficient 600 MW coal fired power plant produces 533.42 MTPH of $CO_2$. (533.42−307.5)/533.42=42.4% Production of enough $H_2$ in the $H_2$ containing Fuel Gas to operate a 41% efficient 600 MW $H_2$ Power Generation Facility via the Pyrolysis Separation of Hydrogen and Carbon where coal is the feedstock without any gas absorption equipment shows a 42.4% reduction in $CO_2$ emissions in comparison to a 35% efficient 600 MW Coal-Fired Power Plant. One embodiment is >35% reduction in $CO_2$ emissions. Another embodiment is >40% reduction in $CO_2$ emissions. The mass balance also shows that the Fuel Gas is 69.13 vol. % $H_2$ gas after Pyrolysis Separation of $H_2$ and Carbon. One embodiment is a fuel gas that is >65% $H_2$ gas.

The Mass Balance Summary shows 465.63 MTPH carbon is produced in the Pyrolysis Separation of Hydrogen and Carbon that produces enough $H_2$ gas to power a 41% efficient $H_2$ Power Generation Facility. The carbon could just be buried and sequestered. As discussed earlier, the carbon has value in various markets and can be readily sold into these markets and be used to develop new markets.

TABLE 4

Mass Balance for Pyrolysis Separation of Hydrogen and Carbon using Pittsburgh 8 Seam Coal as the Feedstock that produces $H_2$ Containing Fuel Gas for a 41% efficient 600 MW Production Facility.

| Gases | MTPH | mol/hr | m³/hr | mol % or vol % | mass % | | |
|---|---|---|---|---|---|---|---|
| *Gases Entering the Pulse Combustor* | | | | | | | |
| $CH_4$ | 48.37 | 3,023,012 | 67,355 | — | 100.00% | Temperature (° C.) | 20 |
| $N_2$ | 10.81 | 385,916 | 8,598 | 6.00% | 5.29% | | |
| $O_2$ | 193.47 | 6,046,024 | 134,709 | 94.00% | 94.71% | Pressure (Pa) | 13,790 |
| $H_2O$ | — | — | — | — | — | | |
| $CO_2$ | — | — | — | — | — | | |
| $N_2 + O_2$ Total | 204.28 | 6,431,940 | 143,308 | 100.00% | 100.00% | | |
| *Gases Exiting the Pulse Combustor* | | | | | | | |
| $N_2$ | 10.81 | 385,916 | 113,806 | 4.08% | 4.28% | Temperature (° C.) | 3,100 |
| $O_2$ | 0.00 | 0 | 0 | 0.00% | 0.00% | | |
| $H_2O$ | 108.83 | 6,046,024 | 1,782,960 | 63.95% | 43.08% | Pressure (Pa) | −500 |
| $CO_2$ | 133.01 | 3,023,012 | 891,480 | 31.97% | 52.65% | | |
| Total | 252.65 | 9,454,952 | 2,788,246 | 100.00% | | Coal Added (ton/hr) | 610.55 |
| *Gases Exiting the Hydrocarbon Pyrolysis Zone* | | | | | | | |
| $N_2$ | 10.81 | 385,916 | 53,413 | 1.41% | 2.72% | Temperature (° C.) | 1,300 |
| $O_2$ | 0.00 | 0 | 0 | 0.00% | 0.00% | | |
| $H_2O$ | 2.62 | 145,803 | 20,180 | 0.53% | 0.66% | Pressure (Pa) | −1,100 |
| $CO_2$ | 307.50 | 6,988,664 | 967,273 | 25.53% | 77.34% | | |
| CO | 0.00 | 0 | 0 | 0.00% | 0.00% | Solids Carbon (ton/hr) | 465.63 |
| $H_2$ | 37.84 | 18,922,393 | 2,618,973 | 69.13% | 9.52% | | |
| NO | 18.29 | 609,691 | 84,385 | 2.23% | 4.60% | | |
| $SO_2$ | 20.51 | 320,395 | 44,345 | 1.17% | 5.16% | | |
| Total | 397.57 | 27,372,862 | 3,788,570 | 100.00% | 100.00% | | |
| *Gases Exiting the Heat Exchanger* | | | | | | | |
| $N_2$ | 10.81 | 385,916 | 14,944 | 1.41% | 2.72% | Temperature (° C.) | 160 |
| $O_2$ | 0.00 | 0 | 0 | 0.00% | 0.00% | | |
| $H_2O$ | 2.62 | 145,803 | 5,646 | 0.53% | 0.66% | Pressure (Pa) | −2,600 |
| $CO_2$ | 307.50 | 6,988,664 | 270,624 | 25.53% | 77.34% | | |
| CO | 0.00 | 0 | 0 | 0.00% | 0.00% | Solids Carbon (ton/hr) | 465.63 |
| $H_2$ | 37.84 | 18,922,393 | 732,737 | 69.13% | 9.52% | | |
| NO | 18.29 | 609,691 | 23,609 | 2.23% | 4.60% | | |
| $SO_2$ | 20.51 | 320,395 | 12,407 | 1.17% | 5.16% | | |
| Total | 397.57 | 27,372,862 | 1,059,967 | 100.00% | 100.00% | | |
| *Gases Exiting the Cyclone* | | | | | | | |
| $N_2$ | 10.81 | 385,916 | 14,835 | 1.41% | 2.72% | Temperature (° C.) | 155 |
| $O_2$ | 0.00 | 0 | 0 | 0.00% | 0.00% | | |
| $H_2O$ | 2.62 | 145,803 | 5,605 | 0.53% | 0.66% | Pressure (Pa) | −3,000 |
| $CO_2$ | 307.50 | 6,988,664 | 268,656 | 25.53% | 77.34% | | |
| CO | 0.00 | 0 | 0 | 0.00% | 0.00% | Solids Carbon (ton/hr) | 29.30 |
| $H_2$ | 37.84 | 18,922,393 | 727,408 | 69.13% | 9.52% | | |
| NO | 18.29 | 609,691 | 23,438 | 2.23% | 4.60% | | |
| $SO_2$ | 20.51 | 320,395 | 12,316 | 1.17% | 5.16% | | |
| Total | 397.57 | 27,372,862 | 1,052,258 | 100.00% | 100.00% | | |
| *Gases Exiting the Baghouse* | | | | | | | |
| $N_2$ | 10.81 | 385,916 | 15,069 | 1.41% | 2.72% | Temperature (° C.) | 150 |
| $O_2$ | 0.00 | 0 | 0 | 0.00% | 0.00% | | |
| $H_2O$ | 2.62 | 145,803 | 5,693 | 0.53% | 0.66% | Pressure (Pa) | −5,500 |
| $CO_2$ | 307.50 | 6,988,664 | 272,886 | 25.53% | 77.34% | | |
| CO | 0.00 | 0 | 0 | 0.00% | 0.00% | Solids Carbon (ton/hr) | 0.00 |
| $H_2$ | 37.84 | 18,922,393 | 738,861 | 69.13% | 9.52% | | |
| NO | 18.29 | 609,691 | 23,807 | 2.23% | 4.60% | | |
| $SO_2$ | 20.51 | 320,395 | 12,510 | 1.17% | 5.16% | | |
| Total | 397.57 | 27,372,862 | 1,068,826 | 100.00% | 100.00% | | |
| *Gases Exiting the Gas Handling Machine* | | | | | | | |
| $N_2$ | 10.81 | 385,916 | 1,671 | 1.41% | 2.72% | Temperature (° C.) | 50 |
| $O_2$ | 0.00 | 0 | 0 | 0.00% | 0.00% | | |
| $H_2O$ | 2.62 | 145,803 | 631 | 0.53% | 0.66% | Pressure (Pa) | 525,000 |
| $CO_2$ | 307.50 | 6,988,664 | 30,255 | 25.53% | 77.34% | | |

TABLE 4-continued

Mass Balance for Pyrolysis Separation of Hydrogen and Carbon using Pittsburgh 8 Seam Coal as the Feedstock that produces $H_2$ Containing Fuel Gas for a 41% efficient 600 MW Production Facility.

| Gases | MTPH | mol/hr | m³/hr | mol % or vol % | mass % | |
|---|---|---|---|---|---|---|
| CO | 0.00 | 0 | 0 | 0.00% | 0.00% | Solids Carbon (ton/hr) |
| $H_2$ | 37.84 | 18,922,393 | 81,918 | 69.13% | 9.52% | 0.00 |
| NO | 18.29 | 609,691 | 2,639 | 2.23% | 4.60% | |
| $SO_2$ | 20.51 | 320,395 | 1,387 | 1.17% | 5.16% | |
| Total | 397.57 | 27,372,862 | 118,501 | 100.00% | 100.00% | |
| Gases Exiting the Gas Absorption | | | | | | |
| $N_2$ | 5.40 | 192,958 | 862 | 0.83% | 2.48% | Temperature (° C.) |
| $O_2$ | 0.00 | 0 | 0 | 0.00% | 0.00% | 20 |
| $H_2O$ | 1.31 | 72,901 | 326 | 0.31% | 0.60% | Pressure (Pa) |
| $CO_2$ | 153.75 | 3,494,332 | 15,610 | 15.10% | 70.62% | 450,000 |
| CO | 0.00 | 0 | 0 | 0.00% | 0.00% | Solids Carbon (ton/hr) |
| $H_2$ | 37.84 | 18,922,393 | 84,528 | 81.75% | 17.38% | 0.00 |
| NO | 9.15 | 304,846 | 1,362 | 1.32% | 4.20% | Gas Adsorption |
| $SO_2$ | 10.25 | 160,197 | 716 | 0.69% | 4.71% | 50% |
| Total | 217.71 | 23,147,628 | 103,403 | 100.00% | 100.00% | |

Gas absorption technology can be used after Pyrolysis Separation of Hydrogen and Carbon. For example, 50% absorption of all the gases other than the $H_2$ in the $H_2$ containing Fuel Gas for the $H_2$ Power Generation Facility changes the composition of the $H_2$ Containing Fuel Gas to >80 vol. % $H_2$. The mass balance shows that 153.75 MTPH of $CO_2$ is emitted from the entire process at 50% absorption of $CO_2$ in the Gas Absorption step. For 80% absorption of $CO_2$, 61.75 MTPH $CO_2$ would be emitted. For 90% absorption of $CO_2$, 30.75 MTPH $CO_2$ would be emitted. Table 5 shows the vol. % $H_2$ in the $H_2$ Containing Fuel Gas and MTPH $CO_2$ remaining in the $H_2$ Containing Fuel Gas for 50% up to 90% Gas Absorption as well as for no gas absorption. For example, 50% Gas Absorption means that 50% of each gas other than $H_2$ in the $H_2$ Containing Fuel Gas are absorbed and removed from the gas stream. Additionally, the percentage reduction is shown for $CO_2$ emissions from the Pyrolysis Separation of Hydrogen and Carbon process with gas absorption compared to $CO_2$ produced in a 35% efficient 600 MW Coal-Fired Power Plant using the same coal that was used in the Pyrolysis Separation of Hydrogen and Carbon to produce the $H_2$ Containing Fuel Gas for the on-site $H_2$ Power Generation Facility. It should be noted that the percentage of gas absorption is based on moles or volume of the gas, not on the mass of the gas.

Approximately 533.42 tons of $CO_2$ would be produced to run a 35% efficient 600 MW Coal-Fired Power Plant. At 50% gas absorption of all gases besides $H_2$, 153.75 MTPH $CO_2$ are emitted after Gas Absorption for a Pyrolysis Separation of Hydrogen and Carbon facility. $CO_2$ reduction is (533.42−153.75)/533.42=71.2% reduction of $CO_2$ compared to the emissions of a 600 MW coal fired power plant when 50% of gases other than $H_2$ gas are absorbed from the product Fuel Gas produced in the process described herein when coal is used as the hydrocarbon feedstock. After absorption of 50% of gases that are not $H_2$, the remaining Fuel Gas is 81.75 vol. % $H_2$. Referring to data shown in Table 5, one embodiment of the Hydrogen Containing Fuel Gas produced by the process is >80 vol % $H_2$. Another embodiment of the Hydrogen Containing Fuel Gas produced by the process is >90 vol % $H_2$. One result of the overall process of combining Pyrolysis Separation of Hydrogen and Carbon and including gas absorption before the $H_2$ Power Generation Facility is >70% reduction of $CO_2$ emissions compared to $CO_2$ emissions produced by a 600 MW coal fired power plant using the same coal as the feedstock. Another embodiment is >80% reduction in $CO_2$ emissions compared to an equivalently sized MW Coal-Fired Power Plant using the same coal as the feedstock. Still another embodiment is >90% reduction in $CO_2$ emissions compared to compared to a an equivalently sized MW Coal-Fired Power Plant using the same coal as the feedstock.

TABLE 5

Comparison of vol. % $H_2$ and MTPH $CO_2$ for the mass balance summary shown in Table 4 for the Pyrolysis Separation of Hydrogen and Carbon when gas absorption is added after pyrolysis. Reduction of $CO_2$ emissions in comparison to an equivalent MW Coal-fired Power Plant is also shown.

| % Gas Absorption | vol. % $H_2$ | MTPH $CO_2$ | Reduction of $CO_2$ |
|---|---|---|---|
| 0% | 69.13% | 307.5 | 42.4% |
| 50% | 81.75% | 153.75 | 71.2% |
| 60% | 84.84% | 123 | 76.9% |
| 70% | 88.19% | 92.25 | 82.7% |
| 80% | 91.80% | 61.5 | 88.5% |
| 90% | 95.73% | 30.75 | 94.2% |

Example 3

CNG can be processed via Pyrolysis Separation of Carbon and Hydrogen to produce $H_2$ that can be burned in a $H_2$ Power Generation Facility. The results for calculations that convert 600 MW of electricity production to the heat in Btu/hr needed to produce 600 MW electricity at a 58% efficient Combined-Cycle CNG-Fired Power Plant are found in Table 6. Calculations summarized in Table 7 show that in order to operate a 58% efficient 600 MW Combined-Cycle CNG-Fired Power Plant, 79.04 MTPH CNG need to be burned. 58% is an average efficiency for a combined cycle natural gas fired power plant.

TABLE 6

Convert 600 MW electricity to MM Btu/hr heat
needed to produce said electricity at a 58%
efficient Combined-Cycle CNG-Fired Power Plant.

| | |
|---|---|
| 600 | MW per hour Power Plant |
| 58% | Efficiency for standard CNG Power Plant |
| 1,034 | MW/hr actual production |
| 3,412,141 | Btu/MW |
| 3,529,801,034 | Btu/hr for 600 MW Power Plant |
| 3.09E+07 | MM Btu/yr for 600 MW Power Plant |

TABLE 7

MTPH of CNG needed to operate a 58% efficient
600 MW Combined Cycle CNG-Fired Power Plant.

| | |
|---|---|
| 20,262 | Btu/lb LHV CNG |
| 4.47E+07 | Btu/MT CNG |
| 79.04 | MTPH CNG |
| 692,405 | MT CNG/yr |

Table 8 shows a mass balance that calculates the MTPH of $CO_2$ produced when 79.04 MTPH is burned. 217.36 MTPH of $CO_2$ are produced when 79.04 MTPH of CNG are burned. 217.36 MTPH represents the amount of $CO_2$ that would be produced if 79.04 MTPH of CNG were burned at a 58% efficient 600 MW Combined Cycle CNG-Fired Power Plant that is 58% efficient. The negative value of $O_2$ represents the amount of $O_2$ that is needed to stoichiometrically react with each element in the CNG and burn it to the oxide form. The total amount of oxygen needed to burn the CNG is 316.17 MTPH.

TABLE 8

Mass balance for burning CNG at a 58% efficient
600 MW Combined-Cycle CNG-Fired Power Plant.

| Element | wt. % | MTPH | $C + O_2 \rightarrow CO_2$ | $4H + O_2 \rightarrow 2H_2O$ | MTPH |
|---|---|---|---|---|---|
| Carbon | 75.00% | 59.28 | −59.28 | | 0.00 |
| Hydrogen | 25.00% | 19.76 | | −19.76 | 0.00 |
| | | 79.04 | | | 0.00 |
| $CO_2$ | | | 217.36 | | 217.36 |
| $H_2O$ | | | | 177.84 | 177.84 |
| $O_2$ | | | −158.08 | −158.08 | −316.17 |
| | | | 0.00 | 0.00 | |

Example 4

A Mass Balance for Pyrolysis Separation of Hydrogen and Carbon using compressed natural gas (CNG) as the Feedstock that produces enough $H_2$ gas to power a 600 MW Hydrogen Power Plant operating at 41% efficiency is shown in Table 9. CNG is 75 wt. % carbon and 25 wt. % hydrogen. The mass balance that is summarized in Table 9 used 130.63 MTPH of CNG feedstock into the Hydrocarbon Pyrolysis Separation Process. The Mass Balance that is summarized in the table below matches up with FIG. 6 which shows the combination of the Pyrolysis Separation of Hydrogen and Carbon, gas absorption, and burning of the $H_2$ gas at an adjacent or on-site $H_2$ Power Generation Facility where the $H_2$ is produced on site with no storage and very short transportation of the $H_2$ gas.

If no $CO_2$ gas absorption is done, then the mass balance shows that 220.84 MTPH of $CO_2$ is produced by the Pyrolysis Separation of Hydrogen and Carbon that is coupled to a 41% efficient 600 MW $H_2$ Power Generation Facility. The mass balance for burning CNG in Table 8 shows that a 58% efficient 600 MW Combined-Cycle CNG fired power plant produces 217.36 MTPH of $CO_2$. (217.36−220.84)/217.36=−1.6% reduction in $CO_2$ by the Pyrolysis Separation of Hydrogen and Carbon process alone. In other words, the Pyrolysis Separation of Hydrogen and Carbon produces approximately the same amount of $CO_2$ as burning CNG in a Combined-Cycle CNG-Fired Power Plant because of the high 58% efficiency of the Combined-Cycle CNG-Fired Power Plant. The mass balance also shows that the Fuel Gas is 77.83 vol. % $H_2$ gas after Pyrolysis Separation of $H_2$ and Carbon and before gas absorption. One embodiment is a fuel gas that is >70% $H_2$ gas.

The Mass Balance Summary shows 72.87 MTPH carbon is produced in the process that produces enough $H_2$ gas to power a 41% efficient $H_2$ Power Generation Facility. The particle size of the carbon is sub-micron in size, similar to carbon black. The production of a valuable solid carbon product while not producing appreciably more $CO_2$ than a high efficiency combined cycle CNG fired power plant is an advantage over the just burning CNG at the power plant. As discussed earlier, the carbon has value in various markets and can be readily sold into these markets as well as be used to develop new markets.

TABLE 9

Mass Balance for Pyrolysis Separation of Hydrogen and Carbon
using CNG as the Feedstock that produces $H_2$ containing Fuel
Gas for a 41% efficient 600 MW Production Facility.

| Gases | MTPH | mol/hr | m³/hr | mol % or vol % | mass % | |
|---|---|---|---|---|---|---|
| Gases Entering the Pulse Combustor | | | | | | |
| $CH_4$ | 40.31 | 2,519,177 | 56,129 | — | 100.00% | Temperature (° C.) |
| $N_2$ | 9.00 | 321,597 | 7,165 | 6.00% | 5.29% | 20 |
| $O_2$ | 161.23 | 5,038,353 | 112,258 | 94.00% | 94.71% | Pressure (Pa) |
| $H_2O$ | — | — | — | — | — | 13,790 |
| $CO_2$ | — | — | — | — | — | |
| $N_2 + O_2$ Total | 170.23 | 5,359,950 | 119,423 | 100.00% | 100.00% | |

TABLE 9-continued

Mass Balance for Pyrolysis Separation of Hydrogen and Carbon using CNG as the Feedstock that produces $_{H2}$ containing Fuel Gas for a 41% efficient 600 MW Production Facility.

| Gases | MTPH | mol/hr | m³/hr | mol % or vol % | mass % | | |
|---|---|---|---|---|---|---|---|
| *Gases Exiting the Pulse Combustor* | | | | | | | |
| $N_2$ | 9.00 | 321,597 | 94,838 | 4.08% | 4.28% | Temperature (° C.) | |
| $O_2$ | 0.00 | 0 | 0 | 0.00% | 0.00% | 3,100 | |
| $H_2O$ | 90.69 | 5,038,353 | 1,485,800 | 63.95% | 43.08% | Pressure (Pa) | |
| $CO_2$ | 110.84 | 2,519,177 | 742,900 | 31.97% | 52.65% | −500 | |
| Total | 210.54 | 7,879,127 | 2,323,539 | 100.00% | | CNG Added (ton/hr) 130.63 | |
| *Gases Exiting the Hydrocarbon Pyrolysis Zone* | | | | | | | |
| $N_2$ | 9.00 | 321,597 | 44,511 | 1.33% | 3.36% | Temperature (° C.) | |
| $O_2$ | 0.00 | 0 | 0 | 0.00% | 0.00% | 1,300 | |
| $H_2O$ | 0.69 | 38,353 | 5,308 | 0.16% | 0.26% | Pressure (Pa) | |
| $CO_2$ | 220.84 | 5,019,177 | 694,684 | 20.69% | 82.31% | −1,100 | |
| $H_2$ | 37.76 | 18,879,438 | 2,613,028 | 77.83% | 14.07% | Solids Carbon (ton/hr) | |
| Total | 268.30 | 24,258,564 | 3,357,532 | 100.00% | 100.00% | 72.87 | |
| *Gases Exiting the Heat Exchanger* | | | | | | | |
| $N_2$ | 9.00 | 321,597 | 12,453 | 1.33% | 3.36% | Temperature (° C.) | |
| $O_2$ | 0.00 | 0 | 0 | 0.00% | 0.00% | 160 | |
| $H_2O$ | 0.69 | 38,353 | 1,485 | 0.16% | 0.26% | Pressure (Pa) | |
| $CO_2$ | 220.84 | 5,019,177 | 194,359 | 20.69% | 82.31% | −2,600 | |
| $H_2$ | 37.76 | 18,879,438 | 731,074 | 77.83% | 14.07% | Solids Carbon (ton/hr) | |
| Total | 268.30 | 24,258,564 | 939,371 | 100.00% | 100.00% | 72.87 | |
| *Gases Exiting the Cyclone* | | | | | | | |
| $N_2$ | 9.00 | 321,597 | 12,363 | 1.33% | 3.36% | Temperature (° C.) | |
| $O_2$ | 0.00 | 0 | 0 | 0.00% | 0.00% | 155 | |
| $H_2O$ | 0.69 | 38,353 | 1,474 | 0.16% | 0.26% | Pressure (Pa) | |
| $CO_2$ | 220.84 | 5,019,177 | 192,945 | 20.69% | 82.31% | −3,000 | |
| $H_2$ | 37.76 | 18,879,438 | 725,756 | 77.83% | 14.07% | Solids Carbon (ton/hr) | |
| Total | 268.30 | 24,258,564 | 932,539 | 100.00% | 100.00% | | |
| *Gases Exiting the Baghouse* | | | | | | | |
| $N_2$ | 9.00 | 321,597 | 12,557 | 1.33% | 3.36% | Temperature (° C.) | |
| $O_2$ | 0.00 | 0 | 0 | 0.00% | 0.00% | 150 | |
| $H_2O$ | 0.69 | 38,353 | 1,498 | 0.16% | 0.26% | Pressure (Pa) | |
| $CO_2$ | 220.84 | 5,019,177 | 195,983 | 20.69% | 82.31% | −5,500 | |
| $H_2$ | 37.76 | 18,879,438 | 737,184 | 77.83% | 14.07% | Solids Carbon (ton/hr) | |
| Total | 268.30 | 24,258,564 | 947,222 | 100.00% | 100.00% | 0.00 | |
| *Gases Exiting the Gas Handling Machine* | | | | | | | |
| $N_2$ | 9.00 | 321,597 | 1,392 | 1.33% | 3.36% | Temperature (° C.) | |
| $O_2$ | 0.00 | 0 | 0 | 0.00% | 0.00% | 50 | |
| $H_2O$ | 0.69 | 38,353 | 166 | 0.16% | 0.26% | Pressure (Pa) | |
| $CO_2$ | 220.84 | 5,019,177 | 21,729 | 20.69% | 82.31% | 525,000 | |
| $H_2$ | 37.76 | 18,879,438 | 81,732 | 77.83% | 14.07% | Solids Carbon (ton/hr) | |
| Total | 268.30 | 24,258,564 | 105,019 | 100.00% | 100.00% | 0.00 | |
| *Gases Exiting the Gas Absorption* | | | | | | | |
| $N_2$ | 4.50 | 160,799 | 718 | 0.75% | 2.94% | Temperature (° C.) | |
| $O_2$ | 0.00 | 0 | 0 | 0.00% | 0.00% | 20 | |
| $H_2O$ | 0.35 | 19,177 | 86 | 0.09% | 0.23% | Pressure (Pa) | |
| $CO_2$ | 110.42 | 2,509,588 | 11,211 | 11.64% | 72.16% | 450,000 | |
| $H_2$ | 37.76 | 18,879,438 | 84,337 | 87.53% | 24.67% | Solids Carbon (ton/hr) | |
| Total | 153.03 | 21,569,001 | 96,351 | 100.00% | 100.00% | 0.00 Gas Adsorption 50% | |

Gas absorption technology can be used after Pyrolysis Separation of Hydrogen and Carbon. 50% absorption of all the gases other than $H_2$ produces a Fuel Gas for the $H_2$ Power Generation Facility that is >80 vol. % $H_2$. The mass balance shows that 110.42 MTPH of $CO_2$ is emitted from the entire process at 50% absorption of $CO_2$ in the Gas Absorption step. For 80% absorption of $CO_2$, 44.17 MTPH $CO_2$ would be emitted. For 90% absorption of $CO_2$, 22.08 MTPH $CO_2$ would be emitted. When all other gases are absorbed at the shown percentage, Table 10 shows the vol. % $H_2$ in the Fuel Gas, MTPH $CO_2$ remaining in the Fuel Gas, and the % reduction in $CO_2$ emissions compared to $CO_2$ produced in a 58% efficient combined cycle 600 MW CNG fired power plant. It should be noted that the percentage of gas absorption is based on moles or volume of the gas, not on the mass of the gas. The table below shows % Gas Absorption for gasses other than $H_2$ gas from 50% up to 90%.

If the CNG is burned at a 58% efficient 600 MW Combined Cycle CNG-Fired power plant, approximately 217.36 tons of $CO_2$ would be produced. If 50% of gases other than hydrogen are absorbed in the fuel gas from Hydrocarbon Pyrolysis Separation, then there would be a (217.36–110.42)/217.36=49.2% reduction of $CO_2$ compared to the emissions of the 58% efficient Combined-Cycle CNG-Fired power plant. After absorption of 50% of gases that are not $H_2$, the remaining Fuel Gas is 87.53 vol. % $H_2$. Referring to data in Table 10, one embodiment of the $H_2$ Containing Fuel Gas produced by Pyrolysis Separation of Hydrogen and Carbon plus Gas Absorption is >85 vol % $H_2$. Another embodiment of the $H_2$ Containing Fuel Gas produced by Pyrolysis Separation of Hydrogen and Carbon plus Gas Absorption is >90 vol % $H_2$. One result of the overall process of combining Pyrolysis Separation of Hydrogen and Carbon with CNG as the feedstock and including gas absorption before the $H_2$ Power Generation Facility is >50% reduction of $CO_2$ emissions compared to an equivalently sized MW Combined-Cycle CNG-Fired Power Plant. Another embodiment is >60% reduction in $CO_2$ emissions when gas absorption technology is used an equivalently sized MW Combined-Cycle CNG-Fired Power Plant. Still another embodiment is >70% reduction in $CO_2$ emissions when gas absorption technology is used an equivalently sized MW Combined-Cycle CNG-Fired Power Plant. Still another embodiment is >80% reduction in $CO_2$ emissions when gas absorption technology is used an equivalently sized MW Combined-Cycle CNG-Fired Power Plant.

TABLE 10

Comparison of vol. % $H_2$ and MTPH $CO_2$ for the mass balance summary shown in Table 9 for the Pyrolysis Separation of Hydrogen and Carbon when gas absorption is added after pyrolysis. Reduction of $CO_2$ emissions in comparison to an equivalent MW Coal-fired Power Plant is also shown.

| % Gas Absorption | vol. % $H_2$ | MTPH $CO_2$ | Reduction of $CO_2$ |
|---|---|---|---|
| 0% | 77.83% | 220.84 | −1.6% |
| 50% | 87.53% | 110.42 | 49.2% |
| 60% | 89.77% | 88.34 | 59.4% |
| 70% | 92.13% | 66.25 | 69.5% |
| 80% | 94.61% | 44.17 | 79.7% |
| 90% | 97.23% | 22.08 | 89.8% |

Example 5

Pittsburgh #8 Seam Coal was the hydrocarbon feedstock for the Pyrolysis Separation of Hydrogen and Carbon process as disclosed herein. Solid carbon particles were separated and subjected to a Secondary Heating Zone. Three samples of carbonized solid carbon particles that exited the process at 1,200° C. (S-1200), graphitized solid carbon particles that exited the system at 2,500° C. (S-2500), graphitized solid carbon particles that exited the system at 2,700° C. (S-2700), and a reference synthetic graphite made from standard synthetic graphite processes known in the industry (G-ref) are listed in Table 11. Additional samples heated to different temperatures are also reported in Table 11, 1,000° C. (S-1000), 1,500° C. (S-1500), 1,800° C. (S-1800). 2,000° C. (S-2000), and 2,900° C. (S-2900). Table 11 shows that heat treatment at high temperature influences the carbon content of the solid carbon particles. Carbon content goes from 80.78% in the as-received coal feedstock to 95.23% for the product that reached a temperature of 1,200° C. to >99% for samples processed above 2,500° C. The CHNSO Analysis is reported on a MAF basis. After high temperature treatment, meaning above 2,500° C., the ash content is less than 1 wt. % at 2500° C. and less than 0.13 wt. % at 2700° C. Nearly all the mineral matter in the coal sample (including clay, sulfide, carbonate, silica and sulfate etc.) evaporated as metals or compounds. As seen in Table 11, the low ash content of the S-2500 and S-2700 were similar to the reference synthetic graphite G-ref. Samples S-2500 and S-2700 and G-ref contained around 99.90 wt. % carbon on a MAF basis while there are negligible other elements. The data in Table 11 shows that the samples are carbonized at >95% carbon on a MAF basis for treatments greater than 1,200° C. A sample that is >90% carbon on a MAF basis is also considered to be carbonized. Further analysis is needed to show that a conversion from amorphous carbonized carbon to graphitized carbon occurs at the higher temperatures, e.g., 2,500° C. and 2,700° C. This analysis is shown below.

TABLE 11

Proximate Analysis and Ultimate Analysis of coal hydrocarbon feedstock and samples treated at various high temperatures.

| | Proximate analysis (wt. %) | | | | Ultimate analysis (wt. %) | | | | |
|---|---|---|---|---|---|---|---|---|---|
| Sample | $M_{ad}$ | $A_d$ | $VM_d$ | $FC_d$ | $C_{MAF}$ | $H_{MAF}$ | $N_{MAF}$ | $S_{MAF}$ | $O_{MAF}{}^a$ |
| Coal Feed | 1.90 | 4.72 | 33.47 | 61.81 | 80.78 | 5.24 | 1.74 | 2.090 | 10.15 |
| S-1000 | 0.15 | 6.19 | 2.61 | 93.66 | 92.51 | 0.223 | 0.96 | 0.577 | 5.73 |
| S-1200 | 0.04 | 6.13 | 2.38 | 91.49 | 95.23 | 0.883 | 0.53 | 0.278 | 3.079 |
| S-1500 | 0.05 | 4.88 | 2.08 | 95.07 | 97.99 | 0.058 | 0.2 | 0.167 | 1.785 |
| S-1800 | 0.05 | 2.52 | 1.89 | 97.43 | 99.45 | 0.061 | 0.03 | 0.030 | 0.429 |
| S-2000 | 0.05 | 1.21 | 1.64 | 98.74 | 99.881 | 0.076 | 0.02 | 0.023 | 0 |
| S-2500 | 0.02 | 0.92 | 0.88 | 98.20 | 99.82 | 0.078 | 0.03 | 0.068 | 0 |
| S-2700 | 0.03 | 0.46 | 0.83 | 99.16 | 99.90 | 0.055 | 0.02 | 0.022 | 0 |

TABLE 11-continued

Proximate Analysis and Ultimate Analysis of coal hydrocarbon
feedstock and samples treated at various high temperatures.

| | Proximate analysis (wt. %) | | | | Ultimate analysis (wt. %) | | | | |
|---|---|---|---|---|---|---|---|---|---|
| Sample | $M_{ad}$ | $A_d$ | $VM_d$ | $FC_d$ | $C_{MAF}$ | $H_{MAF}$ | $N_{MAF}$ | $S_{MAF}$ | $O_{MAF}{}^a$ |
| S-2900 | 0.05 | 0.31 | 0.79 | 99.86 | 99.869 | 0.087 | 0.02 | 0.027 | 0 |
| G-ref | 0.00 | 0.56 | 1.31 | 98.13 | 99.89 | 0.059 | 0.025 | 0.024 | 0 |

M, moisture content
A, ash content
VM, volatile matter content
FC, fixed carbon content
$_{ad}$air dry basis
$_d$dry basis
$_{MAF}$moisture ash free
$^a$by difference
C and O, the carbon content of S-2500, S2700, and G-ref was over 100% which was in the range of systemic error. Oxygen content was assumed to be zero for those samples, and the carbon content was obtained by difference.

Figure 12:
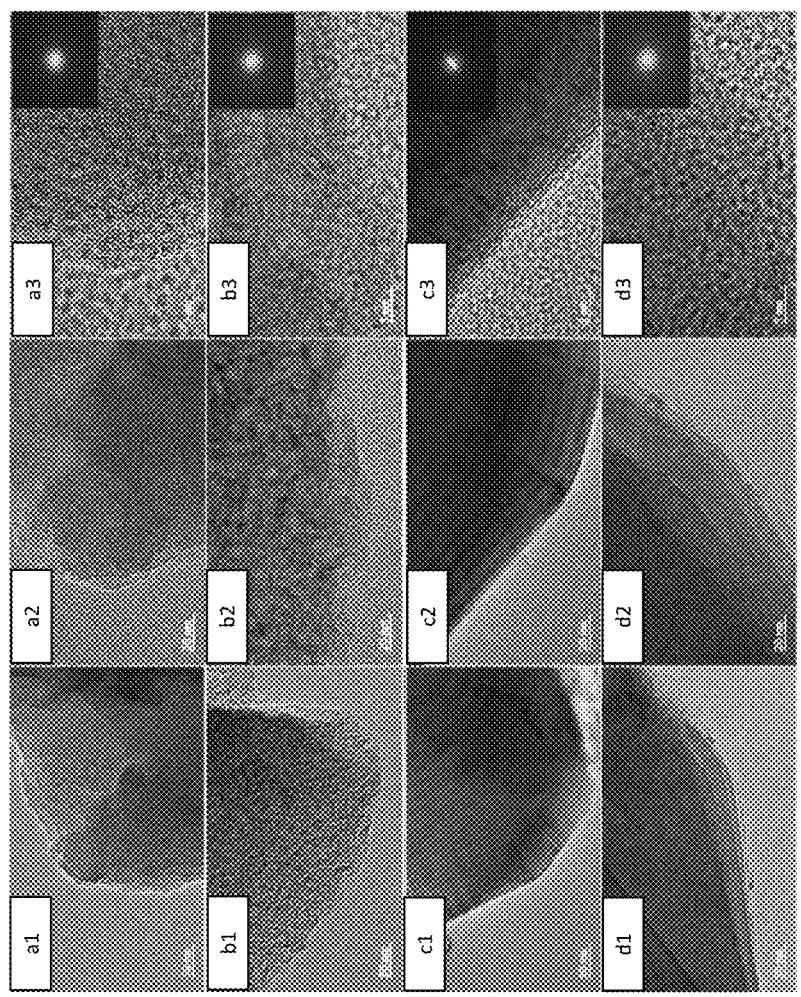
FIG. 12 shows transmission electron microscopy (TEM) images at three different magnifications and fast Fourier transform (FFT) inset images for carbonized solid carbon particles that exited the process at 1,200° C. (sample S-1200, images a1, a2, and a3), graphitized solid carbon particles that exited the system at 2,500° C. (sample S-2500, images b1, b2, and b3), graphitized solid carbon particles that exited the system at 2,700° C. (sample S-2700, images c1, c2, and c3), and a reference synthetic graphite sample (G-ref, images d1, d2, and d3).

FIG. 12 is the transmission electron microscopy (TEM) images of all samples at three different magnifications for each sample. Images a1, a2, and a3 of FIG. 12 showed an amorphous structure for S-1200 processed at 1,200° C. where the fast Fourier transform (FFT) images displayed hollow circles. After high temperature treatment, the high temperature samples S-2500 (images b1, b2, and b3) and S-2700 (images c1, c2, and c3) and the reference sample G-ref (images d1, d2, and d3) exhibited ordered layered structure stacked together mixed with some amorphous structure. The interlayer distance of S-2700 was around 0.34 nm. The multiple sets of dots with six-fold symmetry observed in the FFT images for S-2700 and G-ref indicate more carbon layers in comparison to S-2500. It is consistent with interlayer distance and average crystallite height analysis by XRD (FIG. 13 and Table 12). G-ref showed a typical homogeneous microcrystalline structure where multiple sets of dots with well six-fold symmetry were observed in the FFT images. The FFT images for S-2500 and S-2700 are not as well developed as for the G-ref, indicating some regions of the solid carbon particles are still amorphous.

Figure 13A:
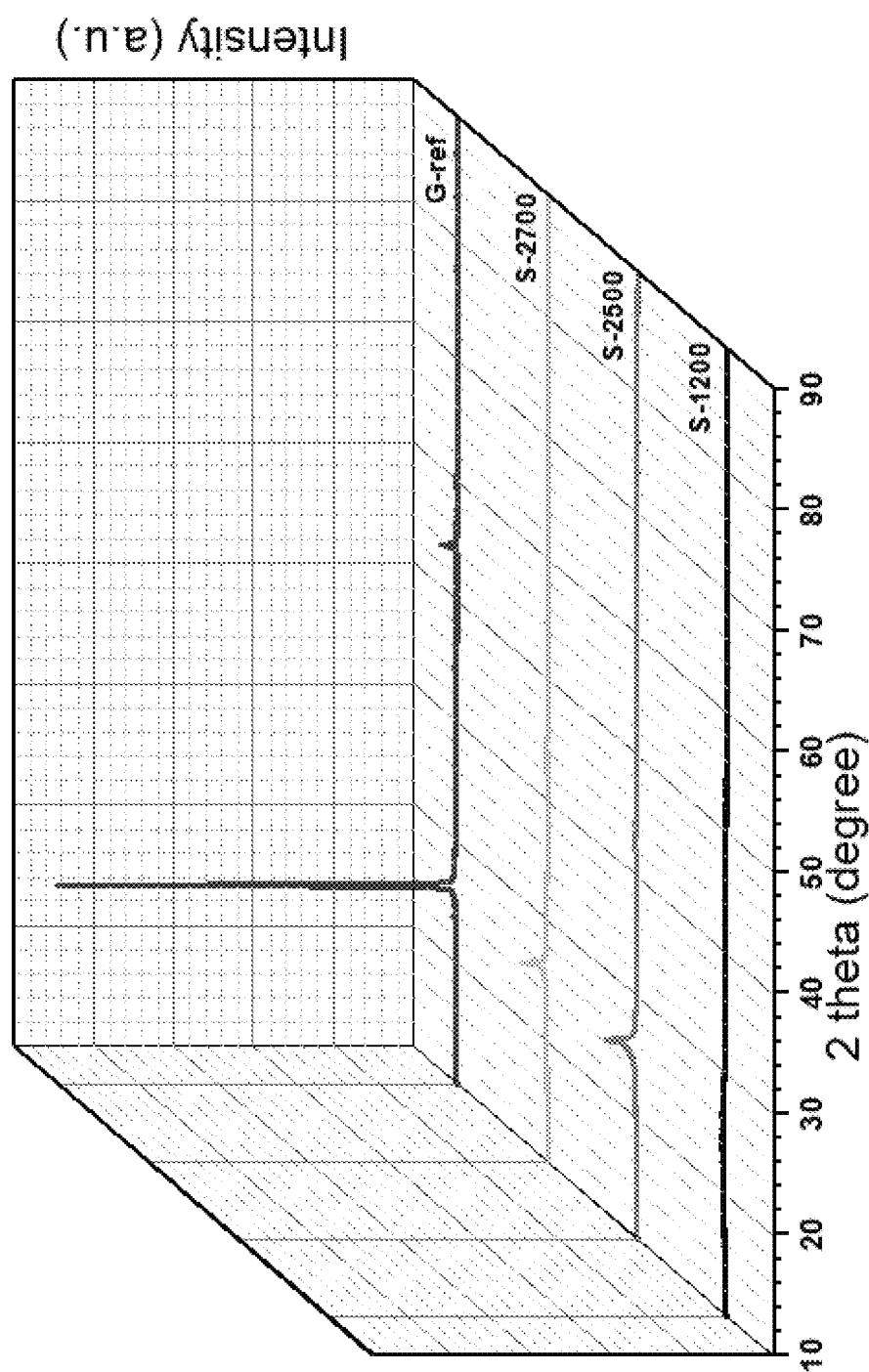
FIGS. 13A and 13B show the X-Ray diffraction (XRD) pattern of the heat-treated samples S-1200, S-2500, S-2700 and the graphite sample G-ref.
Figure 13B:
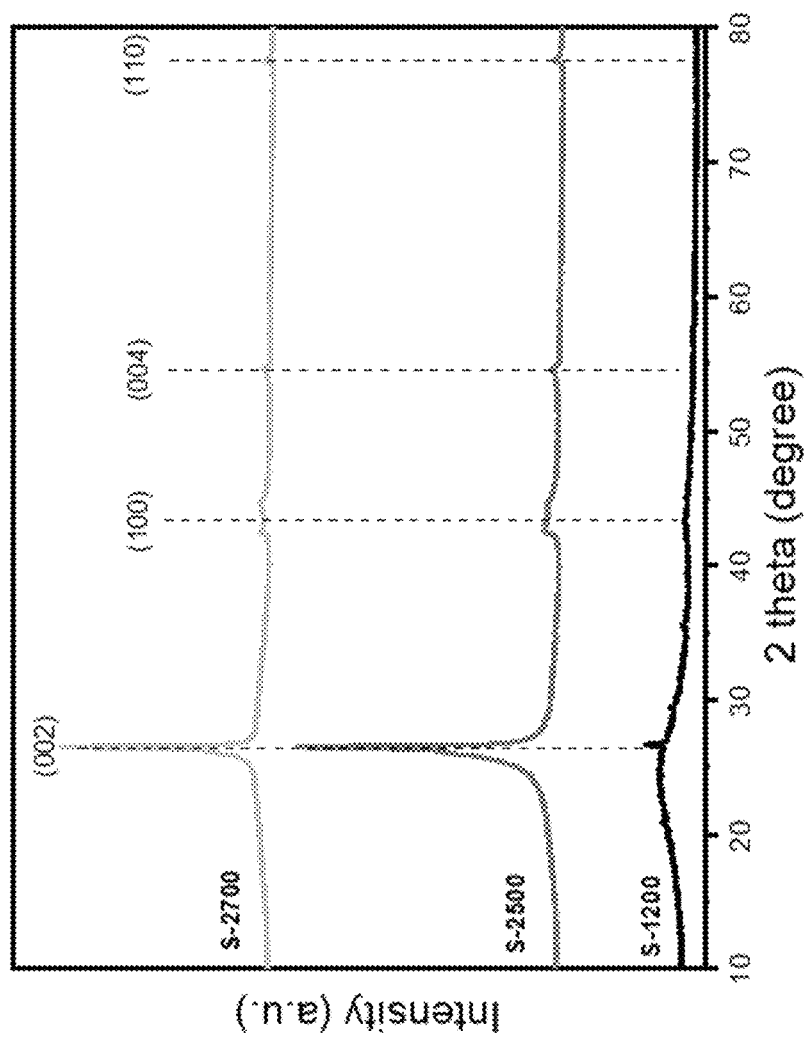

FIGS. 13A and 13B show the XRD pattern of heat-treated samples S-1200, S-2500, S-2700 and G-ref. Table 12 summarizes relevant XRD data for each sample. S-1200 showed a typical amorphous structure without obvious crystal structure; as a result, no XRD data is shown in Table 12. Other samples exhibited graphite structure with a sharp peak at 26.5° and three small peaks at 42.3°, 44.3°, 77.3°, corresponding to (002), (100), (004) and (110) facet of graphite, respectively. The peak intensity of G-ref was much greater than S-2500 and 52700, which means that it had a higher order carbon structure. According to Scherrer formula, the interlayer spacing of S-2500 and S-2700 was about 0.3369 nm and 0.3366 nm respectively and the graphitization degree of 82.69% to 85.59% respectively. G-ref had a graphitization degree of 88.49%. In one or more embodiments of the disclosed invention, the graphitization degree is >80%. The data shows that the high process temperature can break the bridge bond in the amorphous carbon produced at the lower carbonization temperatures, e.g., less than about 1,200° C. and is essential for morphological change from amorphous carbon to the carbon layer stacking of graphite. S-2700 reached a stacking height of 26.97 nm with 81.12 interlayers while S-2500 showed lower stacking height of 19.26 nm and 58.18 layers. The stacking height of G-Ref at 50.57 nm with 151.34 interlayers was two to three times higher than S-2500 and S-2700. It is expected that even higher processing temperatures that approach 3,000° C. would bring the graphite results such as stacking height, # of layers, % graphitization, and FFT images closer to that of the reference graphite sample G-ref. Lower or higher processing temperatures can be chosen to achieve less or more graphitization of the carbon particles depending on the target market. It will be appreciated that the higher the degree of graphitization, the greater the expected value in the marketplace. Higher processing temperature may require greater operation costs and may also result in less throughput to reach and maintain the higher processing temperature.

TABLE 12

Structure parameters of synthetic graphite samples

| Sample | $d_{(002)}$ (nm) | $Lc_{002)}$ (nm) | N | G (%) | $I_D/I_G$ |
|---|---|---|---|---|---|
| S-1200 | — | — | — | — | 0.83 |
| S-2500 | 0.3369 | 19.26 | 58.18 | 82.69 | 0.51 |
| S-2700 | 0.3366 | 26.97 | 81.12 | 85.59 | 0.16 |
| G-Ref | 0.3364 | 50.57 | 151.34 | 88.49 | 0.10 |

$d_{(002)}$ is calculated by Bragg equation: $d_{(002)} = \lambda/2\sin\theta_{(002)}$;
$Lc_{(002)}$ is the average crystallite height: $Lc_{(002)} = 0.89\lambda/(\beta_{002} \times \cos\theta_{(002)})$;
N is the carbon layer accumulation in Microcrystals: $N = Lc_{(002)}/d_{(002)} + 1$;
G is the graphitization degree: $G = (0.3340-d_{(002)})/(0.3440-0.3354)$;
$I_D/I_G$ is the intensity of D-peak divided by G-peak.

Figure 14:
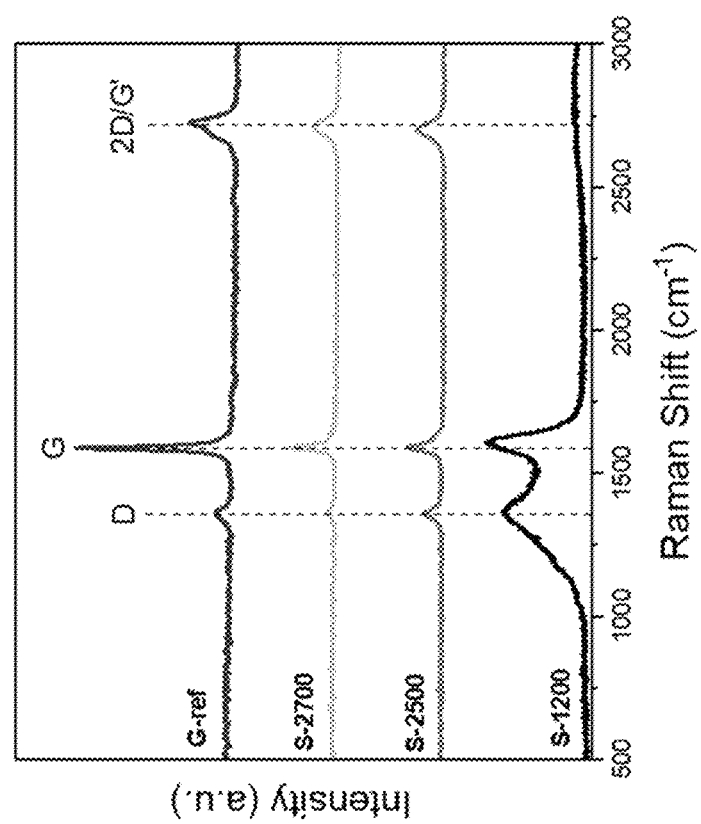
FIG. 14 shows Raman spectra of the heat-treated samples S-1200, S-2500, S-2700 and the graphite sample G-ref.

Raman spectra of all samples are shown in FIG. 14. D-band around 1358 cm$^{-1}$ represents defects and disorders at the edges of the graphite layers; G-band at 1590 cm$^{-1}$ is the vibration of in-plane C—C bonds of graphitic carbon. $I_D/I_G$ is used to describe the disorder degree of the carbon structure. The $I_D/I_G$ values are shown in Table 12. $I_D/I_G$ reduced from 0.83 for S-1200 to 0.51 for G-2500-1. $I_D/I_G$ declined to 0.16 for S-2700. High temperature and ultra-high temperature treatment can transform the amorphous carbon to ordered carbon structure. The G-ref sample presented the least defects with the valve 0.10 of $I_D/I_G$. The peak around 2700 cm$^{-1}$ is a typical graphite peak. It becomes more developed after high temperature processing.

The exposure of a hydrocarbon to the High Temperature Pyrolysis Separation of Hydrogen and Carbon process disclosed herein produces a carbon product with enhanced value in comparison to the hydrocarbon feedstock. The enhanced value may be measured in different ways. For instance, increased carbon content increased its value. Thus, the carbon content may be increased from 75 wt. % in methane gas to become a solid carbon product with greater than 95 wt. % carbon or more. In the case of coal as the hydrocarbon feedstock, the carbon content may increase from about 80 wt. % with other element impurities to 95 wt. % carbon or more with a reduction HNSO from the carbon matrix and a reduction in mineral contaminants. In the case of biowaste, wood, and lignite coal, the carbon content of the dry solid hydrocarbon can be as high as 50 wt. % or lower. The High Temperature Pyrolysis Separation of Hydrogen and Carbon process can produce a carbon product from these solid hydrocarbon feedstocks that are about 90 wt. % carbon or more while driving off HNSO and mineral contaminants. If raised to a high enough temperature, greater than 2,500° C. and reaching up to 3,000° C. or more, the carbon content approaches and exceeds 99%. Furthermore, characterization of the carbon for graphitization can show a degree of graphitization of about 80% or more. The increase in degree of graphitization can also be looked at as an increase in commercial value. Carbonized carbon and graphitized solid carbon have at least two times the commercial value per ton in the marketplace compared to the feedstock hydrocarbons.

EMBODIMENTS

Various embodiments are listed below. It will be understood that the embodiments listed below may be combined with all aspects and other embodiments in accordance with the scope of the invention.

Embodiment 1. A continuous hydrocarbon pyrolysis process to produce hydrogen gas and carbon comprising exposing a hydrocarbon feedstock to an oxygen depleted combustion gas within a hydrocarbon pyrolysis zone, wherein the combustion gas is produced by a valveless pulse combustor, wherein the combustion gas enter the hydrocarbon pyrolysis zone at a combustion gas temperature greater than 2,400° C., wherein the hydrocarbon feedstock and combustion gas have a residence time within the hydrocarbon pyrolysis zone less than 30 seconds to cause pyrolysis of the hydrocarbon feedstock and produce gas comprising hydrogen and solid particles comprising carbon.

Embodiment 2. The hydrocarbon pyrolysis process according to Embodiment 1, wherein the hydrocarbon feedstock is selected from gaseous, liquid, and solid hydrocarbon materials.

Embodiment 3. The hydrocarbon pyrolysis process according to Embodiments 1 or 2, wherein the valveless pulse combustor is operated by burning a fuel with an oxygen source having an oxygen content greater than 50 vol. % oxygen.

Embodiment 4. The hydrocarbon pyrolysis process according to Embodiments 1 or 2, wherein the oxygen source has an oxygen content greater than 85 vol. % oxygen.

Embodiment 5. The hydrocarbon pyrolysis process according to Embodiments 1 or 2, wherein the oxygen source has an oxygen content greater than 90 vol. % oxygen.

Embodiment 6. The hydrocarbon pyrolysis process according to any preceding Embodiment, wherein the oxygen depleted combustion gas has an oxygen content less than 2 vol. % oxygen.

Embodiment 7. The hydrocarbon pyrolysis process according to any preceding Embodiment, wherein the oxygen depleted combustion gas has an oxygen content less than 1 vol. % oxygen.

Embodiment 8. The hydrocarbon pyrolysis process according to any preceding Embodiment, wherein the residence time within the hydrocarbon pyrolysis zone is less than 5 seconds.

Embodiment 9. The hydrocarbon pyrolysis process according to any preceding Embodiment, wherein the residence time within the hydrocarbon pyrolysis zone is less than 2 seconds.

Embodiment 10. The hydrocarbon pyrolysis process according to any preceding Embodiment, wherein the gas and solid particles produced in the hydrocarbon pyrolysis zone exit the hydrocarbon pyrolysis zone at a temperature greater than 1,200° C.

Embodiment 11. The hydrocarbon pyrolysis process according to Embodiment 10, comprising cooling the gas and solid particles which exit the hydrocarbon pyrolysis zone to a temperature less than 200° C. in a heat exchanger.

Embodiment 12. The hydrocarbon pyrolysis process according to Embodiment 11, comprising separating the solid particles from the gas.

Embodiment 13. The hydrocarbon pyrolysis process according to Embodiment 12, comprising treating the gas to remove unwanted particles and gas molecules to produce $H_2$ containing gas having an $H_2$ concentration greater than 80 vol. % $H_2$.

Embodiment 14. The hydrocarbon pyrolysis process according to Embodiment 12, comprising treating the gas to remove unwanted particles and gas molecules to produce $H_2$ containing gas having an $H_2$ concentration greater than 90 vol. % $H_2$.

Embodiment 15. The hydrocarbon pyrolysis process according to Embodiment 13, comprising continuously introducing the $H_2$ containing gas to a power generation facility without long-term storage.

Embodiment 16. The hydrocarbon pyrolysis process according to Embodiment 13, comprising continuously introducing the $H_2$ containing gas to a metal production facility without long-term storage.

Embodiment 17. The hydrocarbon pyrolysis process according to Embodiment 14, comprising continuously introducing the $H_2$ containing gas to a chemical production facility without long-term storage.

Embodiment 18. The hydrocarbon pyrolysis process according to Embodiment 12, wherein the solid particles have a carbon content greater than 90 wt. % as characterized by CHNSO Analysis.

Embodiment 19. The hydrocarbon pyrolysis process according to Embodiment 12, comprising heating the solid particles to a temperature greater than 2,500° C.

Embodiment 20. The hydrocarbon pyrolysis process according to Embodiment 19, wherein the solid particles comprise carbon having a percent graphitization greater than 80% as characterized by X-Ray diffraction.

Embodiment 21. A system for continuous hydrocarbon pyrolysis to produce hydrogen gas and carbon comprising: a valveless pulse combustor which burns a fuel and an oxygen source to produce a combustion gas, wherein the oxygen source comprises an oxygen content greater than 85 vol. % oxygen, wherein the combustion gas is oxygen depleted; a hydrocarbon pyrolysis zone configured to receive the combustion gas and a quantity of hydrocarbon feedstock, wherein the combustion gas enters the hydrocarbon pyrolysis zone at a temperature greater than 2,400° C., wherein the hydrocarbon feedstock and the combustion gas have a residence time within the hydrocarbon pyrolysis zone less than 30 seconds to cause pyrolysis of the hydrocarbon feedstock and produce gas and solid particles comprising hydrogen gas and carbon, wherein the gas and solid particles produced in the hydrocarbon pyrolysis zone exit the hydrocarbon pyrolysis zone at a temperature greater than 1,200° C.; and a heat exchanger configured to cool the gas and solid particles which exit the hydrocarbon pyrolysis zone to a temperature less than 200° C.

Embodiment 22. The system for continuous hydrocarbon pyrolysis to produce hydrogen gas and carbon according to Embodiment 21, comprising a gas/particle separator to separate the solid particles from the gas.

Embodiment 23. The system for continuous hydrocarbon pyrolysis to produce hydrogen gas and carbon according to Embodiment 22, wherein the gas/particle separator is selected from a cyclone gas/particle separator and a baghouse gas/particle separator.

Embodiment 24. The system for continuous hydrocarbon pyrolysis to produce hydrogen gas and carbon according to any preceding Embodiment, comprising a gas absorber to remove unwanted gas molecules from the gas and produce $H_2$ containing gas having an $H_2$ concentration greater than 80 vol. % $H_2$.

Embodiment 25. A combined system for continuous hydrocarbon pyrolysis to produce hydrogen gas and to receive and burn the hydrogen gas to generate power comprising: a valveless pulse combustor which burns a fuel and an oxygen source to produce a combustion gas, wherein the oxygen source comprises an oxygen content greater than 85 vol. % oxygen, wherein the combustion gas is oxygen depleted; a hydrocarbon pyrolysis zone configured to receive the combustion gas and a quantity of hydrocarbon feedstock, wherein the combustion gas enters the hydrocarbon pyrolysis zone at a temperature greater than 2,400° C., wherein the hydrocarbon feedstock and the combustion gas have a residence time within the hydrocarbon pyrolysis zone less than 30 seconds to cause pyrolysis of the hydrocarbon feedstock and produce gas and solid particles comprising hydrogen gas and carbon, wherein the gas and solid particles produced in the hydrocarbon pyrolysis zone exit the hydrocarbon pyrolysis zone at a temperature greater than 1,200° C.; a heat exchanger configured to cool the gas and solid particles which exit the hydrocarbon pyrolysis zone to a temperature less than 200° C.; a gas/particle separator to separate the solid particles from the gas; a gas absorber to remove unwanted gas molecules from the gas and produce a continuous source of $H_2$ containing gas having an $H_2$ concentration greater than 80 vol. % $H_2$; and a power generation facility connected to the continuous source of $H_2$ containing gas which burns the $H_2$ containing gas to generate power.

The described embodiments and examples are all to be considered in every respect as illustrative only, and not as being restrictive. The scope of the invention is, therefore, indicated by the appended claims, rather than by the foregoing description. All changes that come within the meaning and range of equivalency of the claims are to be embraced within their scope.

The invention claimed is:

1. A continuous hydrocarbon pyrolysis process to produce hydrogen gas and carbon comprising exposing a hydrocarbon feedstock to an oxygen depleted combustion gas within a hydrocarbon pyrolysis zone, wherein the combustion gas is produced by a valveless pulse combustor, wherein the combustion gas enter the hydrocarbon pyrolysis zone at a combustion gas temperature greater than 2,400° C., wherein the hydrocarbon feedstock and combustion gas have a residence time within the hydrocarbon pyrolysis zone less than 30 seconds to cause pyrolysis of the hydrocarbon feedstock and produce gas comprising hydrogen and solid particles comprising carbon.

2. The hydrocarbon pyrolysis process according to claim 1, wherein the hydrocarbon feedstock is selected from gaseous, liquid, and solid hydrocarbon materials.

3. The hydrocarbon pyrolysis process according to claim 1, wherein the valveless pulse combustor is operated by burning a fuel with an oxygen source having an oxygen content greater than 50 vol. % oxygen.

4. The hydrocarbon pyrolysis process according to claim 3, wherein the oxygen source has an oxygen content greater than 85 vol. % oxygen.

5. The hydrocarbon pyrolysis process according to claim 3, wherein the oxygen source has an oxygen content greater than 90 vol. % oxygen.

6. The hydrocarbon pyrolysis process according to claim 1, wherein the oxygen depleted combustion gas has an oxygen content less than 2 vol. % oxygen.

7. The hydrocarbon pyrolysis process according to claim 1, wherein the oxygen depleted combustion gas has an oxygen content less than 1 vol. % oxygen.

8. The hydrocarbon pyrolysis process according to claim 1, wherein the residence time within the hydrocarbon pyrolysis zone is less than 5 seconds.

9. The hydrocarbon pyrolysis process according to claim 1, wherein the residence time within the hydrocarbon pyrolysis zone is less than 2 seconds.

10. The hydrocarbon pyrolysis process according to claim 1, wherein the gas and solid particles produced in the hydrocarbon pyrolysis zone exit the hydrocarbon pyrolysis zone at a temperature greater than 1,200° C.

11. The hydrocarbon pyrolysis process according to claim 10, comprising cooling the gas and solid particles which exit the hydrocarbon pyrolysis zone to a temperature less than 200° C. in a heat exchanger.

12. The hydrocarbon pyrolysis process according to claim 11, comprising separating the solid particles from the gas.

13. The hydrocarbon pyrolysis process according to claim 12, comprising treating the gas to remove unwanted particles and gas molecules to produce $H_2$ containing gas having an $H_2$ concentration greater than 80 vol. % $H_2$.

14. The hydrocarbon pyrolysis process according to claim 12, comprising treating the gas to remove unwanted particles and gas molecules to produce $H_2$ containing gas having an $H_2$ concentration greater than 90 vol. % $H_2$.

15. The hydrocarbon pyrolysis process according to claim 13, comprising continuously introducing the $H_2$ containing gas to a power generation facility without long-term storage.

16. The hydrocarbon pyrolysis process according to claim 13, comprising continuously introducing the $H_2$ containing gas to a metal production facility without long-term storage.

17. The hydrocarbon pyrolysis process according to claim 14, comprising continuously introducing the $H_2$ containing gas to a chemical production facility without long-term storage.

18. The hydrocarbon pyrolysis process according to claim 12, wherein the solid particles have a carbon content greater than 90 wt. % as characterized by CHNSO Analysis.

19. The hydrocarbon pyrolysis process according to claim 12, comprising heating the solid particles to a temperature greater than 2,500° C.

20. The hydrocarbon pyrolysis process according to claim 19, wherein the solid particles comprise carbon having a percent graphitization greater than 80% as characterized by X-Ray diffraction.

21. A system for continuous hydrocarbon pyrolysis to produce hydrogen gas and carbon comprising:
a valveless pulse combustor which burns a fuel and an oxygen source to produce a combustion gas, wherein the oxygen source comprises an oxygen content greater than 85 vol. % oxygen, wherein the combustion gas is oxygen depleted;

a hydrocarbon pyrolysis zone configured to receive the combustion gas and a quantity of hydrocarbon feedstock, wherein the combustion gas enters the hydrocarbon pyrolysis zone at a temperature greater than 2,400° C., wherein the hydrocarbon feedstock and the combustion gas have a residence time within the hydrocarbon pyrolysis zone less than 30 seconds to cause pyrolysis of the hydrocarbon feedstock and produce gas and solid particles comprising hydrogen gas and carbon, wherein the gas and solid particles produced in the hydrocarbon pyrolysis zone exit the hydrocarbon pyrolysis zone at a temperature greater than 1,200° C.; and a heat exchanger configured to cool the gas and solid particles which exit the hydrocarbon pyrolysis zone to a temperature less than 200° C.

22. The system for continuous hydrocarbon pyrolysis to produce hydrogen gas and carbon according to claim 21, comprising a gas/particle separator to separate the solid particles from the gas.

23. The system for continuous hydrocarbon pyrolysis to produce hydrogen gas and carbon according to claim 22, wherein the gas/particle separator is selected from a cyclone gas/particle separator and a baghouse gas/particle separator.

24. The system for continuous hydrocarbon pyrolysis to produce hydrogen gas and carbon according to claim 21, comprising a gas absorber to remove unwanted gas molecules from the gas and produce $H_2$ containing gas having an $H_2$ concentration greater than 80 vol. % $H_2$.

25. A combined system for continuous hydrocarbon pyrolysis to produce hydrogen gas and to receive and burn the hydrogen gas to generate power comprising:
a valveless pulse combustor which burns a fuel and an oxygen source to produce a combustion gas, wherein the oxygen source comprises an oxygen content greater than 85 vol. % oxygen, wherein the combustion gas is oxygen depleted;
a hydrocarbon pyrolysis zone configured to receive the combustion gas and a quantity of hydrocarbon feedstock, wherein the combustion gas enters the hydrocarbon pyrolysis zone at a temperature greater than 2,400° C., wherein the hydrocarbon feedstock and the combustion gas have a residence time within the hydrocarbon pyrolysis zone less than 30 seconds to cause pyrolysis of the hydrocarbon feedstock and produce gas and solid particles comprising hydrogen gas and carbon, wherein the gas and solid particles produced in the hydrocarbon pyrolysis zone exit the hydrocarbon pyrolysis zone at a temperature greater than 1,200° C.;
a heat exchanger configured to cool the gas and solid particles which exit the hydrocarbon pyrolysis zone to a temperature less than 200° C.;
a gas/particle separator to separate the solid particles from the gas;
a gas absorber to remove unwanted gas molecules from the gas and produce a continuous source of $H_2$ containing gas having an $H_2$ concentration greater than 80 vol. % $H_2$; and
a power generation facility connected to the continuous source of $H_2$ containing gas which burns the $H_2$ containing gas to generate power.

* * * * *